US008566218B2

(12) United States Patent
Czupek et al.

(10) Patent No.: US 8,566,218 B2
(45) Date of Patent: Oct. 22, 2013

(54) SYSTEMS AND METHODS FOR MATCHING ONE OR MORE INCOMING ORDER TO A STANDING ORDER AS A FUNCTION OF AN INNER MARKET PARAMETER

(75) Inventors: Andrew P. Czupek, New Lenox, IL (US); Bryan T. Durkin, Orland Park, IL (US); Thomas G. McCabe, Chicago, IL (US); Brian M. Wolf, Roselle, IL (US); Donald M. Cuba, Tinley Park, IL (US); Jonathan G. Kronstein, Elmhurst, IL (US); Troy C. Kane, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1206 days.

(21) Appl. No.: 12/246,755

(22) Filed: Oct. 7, 2008

(65) Prior Publication Data
US 2010/0088212 A1 Apr. 8, 2010

(51) Int. Cl.
*G06Q 40/00* (2012.01)
*G06Q 40/06* (2012.01)
*G06Q 40/04* (2012.01)

(52) U.S. Cl.
CPC ............... *G06Q 40/00* (2013.01); *G06Q 40/06* (2013.01); *G06Q 40/04* (2013.01)
USPC ................ 705/37; 705/36 R; 705/35; 705/38

(58) Field of Classification Search
None
See application file for complete search history.

(56) References Cited

U.S. PATENT DOCUMENTS

| 5,077,665 | A | 12/1991 | Silverman et al. | |
|---|---|---|---|---|
| 5,832,462 | A | 11/1998 | Midorikawa et al. | |
| 7,089,206 | B2 | 8/2006 | Martin | |
| 7,110,975 | B2 | 9/2006 | Marks de Chabris et al. | |
| 7,165,048 | B2 | 1/2007 | Heppenstall, Jr. | |
| 7,225,153 | B2 | 5/2007 | Lange | |
| 7,233,923 | B1 | 6/2007 | Wallace et al. | |
| 7,246,093 | B1 | 7/2007 | Katz | |
| 7,472,087 | B2 * | 12/2008 | Keith | 705/37 |
| 7,496,533 | B1 * | 2/2009 | Keith | 705/37 |
| 7,742,977 | B1 * | 6/2010 | Borsand | 705/37 |

(Continued)

OTHER PUBLICATIONS

Golden Lion Fund Ltd. (a St. Vincent and the Grenadines international business company); Feb. 14, 2007; www.regent.vc/fund.../Golden_Lion_Fund_Ltd_Offering_Memo.pdf; 50 pages.*

(Continued)

*Primary Examiner* — Ella Colbert
*Assistant Examiner* — Mary Gregg
(74) *Attorney, Agent, or Firm* — Lempia Summerfield Katz LLC

(57) ABSTRACT

A method of order allocation is disclosed. The method includes receiving an incoming order, establishing an inner market representing a first portion of an order book which may be defined as a function of an inner market parameter, designating the first portion of the order book as a priority and allocating the first portion of the received incoming order based on the priority, establishing an outer market that represents a second portion of the order book that includes the remainder of the order book not represented by the inner market of the order book, assigning the received incoming order to one of the inner or outer markets as a function of the inner market parameter, allocating a first portion of the incoming order to the inner market utilizing a first-in, first-out (FIFO) algorithm, and allocating a second portion, in excess of the first portion, of the incoming order to the outer market using a pro-rata algorithm.

25 Claims, 24 Drawing Sheets

(56) References Cited

U.S. PATENT DOCUMENTS

| | | | | |
|---|---|---|---|---|
| 7,765,134 | B1* | 7/2010 | Pazner | 705/35 |
| 7,827,092 | B2 | 11/2010 | Chait et al. | |
| 8,001,036 | B2* | 8/2011 | Brown et al. | 705/37 |
| 8,032,437 | B2* | 10/2011 | Tanpoco | 705/35 |
| 2002/0013753 | A1 | 1/2002 | Marks de Chabris et al. | |
| 2002/0026429 | A1 | 2/2002 | Lostis et al. | |
| 2002/0099647 | A1 | 7/2002 | Howorka et al. | |
| 2002/0107748 | A1 | 8/2002 | Boies et al. | |
| 2003/0009414 | A1* | 1/2003 | Furbush et al. | 705/37 |
| 2003/0088501 | A1* | 5/2003 | Gilbert et al. | 705/37 |
| 2003/0110113 | A1 | 6/2003 | Martin | |
| 2003/0126066 | A1* | 7/2003 | Nunes et al. | 705/37 |
| 2003/0177086 | A1 | 9/2003 | Gomber et al. | |
| 2003/0225672 | A1 | 12/2003 | Hughes et al. | |
| 2003/0225673 | A1 | 12/2003 | Hughes et al. | |
| 2004/0044611 | A1 | 3/2004 | Heppenstall, Jr. | |
| 2004/0059666 | A1 | 3/2004 | Waelbroech et al. | |
| 2004/0088242 | A1* | 5/2004 | Ascher et al. | 705/37 |
| 2004/0111358 | A1 | 6/2004 | Lange et al. | |
| 2004/0172337 | A1 | 9/2004 | Spoonhower et al. | |
| 2004/0172338 | A1 | 9/2004 | Spoonhower et al. | |
| 2004/0210511 | A1 | 10/2004 | Waelbroech et al. | |
| 2004/0260640 | A1* | 12/2004 | Crosthwaite et al. | 705/37 |
| 2005/0091142 | A1 | 4/2005 | Renton et al. | |
| 2005/0154660 | A1 | 7/2005 | Sturm et al. | |
| 2005/0171889 | A1 | 8/2005 | Daley et al. | |
| 2005/0171890 | A1 | 8/2005 | Daley et al. | |
| 2005/0240510 | A1 | 10/2005 | Schweickert et al. | |
| 2006/0015448 | A1 | 1/2006 | Burkhardt et al. | |
| 2006/0036448 | A1 | 2/2006 | Haynie et al. | |
| 2006/0069633 | A1 | 3/2006 | Breslow et al. | |
| 2006/0069639 | A1* | 3/2006 | Kalt | 705/37 |
| 2006/0080219 | A1 | 4/2006 | Lutnick et al. | |
| 2006/0106708 | A1 | 5/2006 | Abushaban et al. | |
| 2006/0149659 | A1* | 7/2006 | Carone et al. | 705/37 |
| 2006/0218071 | A1* | 9/2006 | Sweeting | 705/37 |
| 2006/0259402 | A1* | 11/2006 | West et al. | 705/37 |
| 2006/0259403 | A1* | 11/2006 | Monroe et al. | 705/37 |
| 2007/0067231 | A1 | 3/2007 | Marks de Chabris et al. | |
| 2007/0083453 | A1 | 4/2007 | Heppenstall, Jr. | |
| 2007/0100732 | A1 | 5/2007 | Ibbotson et al. | |
| 2007/0130050 | A1 | 6/2007 | Claus et al. | |
| 2007/0162378 | A1 | 7/2007 | Lutnick et al. | |
| 2007/0174162 | A1 | 7/2007 | Lutnick et al. | |
| 2007/0263233 | A1 | 11/2007 | Mei et al. | |
| 2007/0294160 | A1 | 12/2007 | Brown et al. | |
| 2008/0010186 | A1 | 1/2008 | Weimer et al. | |
| 2008/0046354 | A1 | 2/2008 | Olsson et al. | |
| 2008/0243576 | A1 | 10/2008 | Czupek et al. | |
| 2009/0125431 | A1* | 5/2009 | Armstrong et al. | 705/37 |
| 2009/0276348 | A1* | 11/2009 | Kessler et al. | 705/37 |
| 2012/0303513 | A1* | 11/2012 | Buck | 705/37 |

OTHER PUBLICATIONS

AtosEuronext MarketSolutions, Functional Definition of LIFFE Connect, 2005; 234 pages.*
Matching Algorithms of International Exchanges; Karel Jane cek & Martin Kabrhel RSJ Invest a.s. Prague, Dec. 1, 2007; 21 pages.*
Look Before You Leap Into over-the-counter securities. (1952). Changing Times (Pre-1986), 6(7), 15-15. Retrieved from http://search.proquest.com/docview/199147968?accountid=14753.*
Jarrow, R., & Purnanandam, A. (2007). The valuation of a firm's investment opportunities: A reduced form credit risk perspective. Review of Derivatives Research, 10(1), 39-58. doi: http://dx.doi.org/10.1007/s11147-007-9012-8.*
International Preliminary Report on Patentability in International Patent Application No. PCT/US2009/058181, dated Apr. 12, 2011, 5 pages.
International Preliminary Report on Patentability in International Patent Application No. PCT/US2009/058926, dated Apr. 12, 2011, 6 pages.
International Preliminary Report on Patentability in International Patent Application No. PCT/US2009/057986 dated Apr. 12, 2011, 5 pages.
Chicago Mercantile Exchange, "CME Globex Functionality", http://www.cme.com/trading/get/abt/functionality/matching.html.
Chicago Mercantile Exchange, "Lead Market Maker (LMM) Allocation Algorithm", http://www.cme.com/trading/get/abt/functionality/lmm.html.
Chicago Mercantile Exchange, "NYMEX LMM Allocation Algorithm", http://www.cme.com/trading/get/abt/functionality/nymex.html.
Chicago Mercantile Exchange, "Allocation (Pro-Rata) Algorithm for CME Eurodollar Futures", http://www.cme.com/trading/get/abt/functionality/allocation.html.
Chicago Mercantile Exchange, "Allocation Algorithm for CME Eurodollar Options" http://www.cme.com/trading/get/abt/functionality/edo.html.
Chicago Mercantile Exchange, "FIFO Matching Algorithm", http://www.cme.com/trading/get/abt/functionality/fifo.html.
Chicago Mercantile Exchange, "CME and Tullett Liberty to Join Forces to Introduce Innovative Matching and Clearing Capabilities for OTC Markets", http://files.shareholder.com/downloads/CME/0x0x114937/270df748-2498-4589-810a-c148642b7780/CME_News_2004_3_17_General.pdf.
"A/c/e, Alliance/CBOT/Eurex, Business Requirements" Jan. 2002.
CME Group, "Client System Impact: CBOT and CBOT Hosted Exchange Products on CME Globex," Version 2.0, Jan. 15, 2008, http://www.cme.com/files/cbotclientimpact.pdf.
The Federal Register Notices, "Self-regulatory organization; Proposed Rule Changes:" Jun. 28, 2007, http://www.thefederalregister.com/d.p/2007-07-05-E7-12940.
"GL Trade, User Guide for Globex$_2$," Apr. 1999.
Globex, "User Guide" Jan. 1997, Reuters Financial Media Professional.
EDGAROnline, Investment Technology Group Inc.—ITG Annual Report (10-K)—Mar. 15, 2006, http://64.233.167.104/search?q=cache:WI51bZluYtMJ:sec.edgar-online.com/2006/03/15/0001104659-06-016833/Section2.asp+%22match+algorithm%22+exchange+nyse+trade&hl=en&ct=clnk&cd=2&gl=us (website currently unavailable).
"Project A Customer Information Statement, Before You Trade Through Project A" 1992.
"Project A, User Manual", Version 1.0, Sep. 1994, Ceres Trading Limited Partnership.
Chicago Mercantile Exchange, OneChicago, "CME User Reference Guide," V 5.0, http://www.cmegroup.com/cmegroup/clearing/files/UserReferenceGuide5.pdf.
Atos Euronext Market Solutions, Functional Definition of LIFFE Connect®, Version 9.0, dated 2005.
Chicago Board of Trade, How the e-bot® Market Works, 2003.
London Stock Exchange "Guide to Trading Services" Apr. 2003, www.londonstockexchange.com/cmsattach/1645.doc.
U.S. Appl. No. 11/729,578, filed Mar. 29, 2007.
U.S. Appl. No. 12/246,775, filed Oct. 7, 2008.
U.S. Appl. No. 12/246,796, filed Oct. 7, 2008.
U.S. Appl. No. 12/246,818, filed Oct. 7, 2008.
U.S. Appl. No. 12/246,832, filed Oct. 7, 2008.
Functional Definition of LIFFE Connect, LIFFE Connect Version 9.0, issued version 2.0, 2005.
Functional Definition of LIFFE Connect for the Chicago Board of Trade, LIFFE Connect version 7.1, CBOT, issued version 2.6, Dec. 2003.
International Search Report and Written Opinion in International Patent Application No. PCT/US08/03538, dated Jun. 12, 2008.
Canadian Examiner's Report, from Canadian Application No. 2,739,738, dated Aug. 1, 2013, CA.

* cited by examiner

INCOMING ORDER: SELL 100 AT 111.01

| ORDER (BUY) | PRICE | TIME | QTY | FIFO ALLOCATION |
|---|---|---|---|---|
| A | 111.03 | 9:30:05 | 30 | 30 |
| B | 111.02 | 9:25:08 | 50 | 50 |
| C | 111.02 | 9:25:26 | 40 | 20 |
| D | 111.02 | 9:25:30 | 10 | 0 |
| E | 111.02 | 9:26:00 | 11 | 0 |
| TOTAL | | | | 100 |

INCOMING ORDER: SELL 100 AT 111.01

| ORDER (BUY) | PRICE | TIME | QTY | PROPORTION | FIFO ALLOCATION |
|---|---|---|---|---|---|
| A | 111.03 | 9:30:05 | 30 | N/A | 30 |
| B | 111.02 | 9:25:08 | 50 | 45% | 32 |
| C | 111.02 | 9:25:26 | 40 | 36% | 25 |
| D | 111.02 | 9:25:30 | 10 | 9% | 6 |
| E | 111.02 | 9:26:00 | 11 | 10% | 7 |
| TOTAL | | | 141 | | 100 |

PRIORITY: IMPROVE MARKET
MIN: 20
MAX: 50
INCOMING ORDER: SELL 110 AT 111.01

| ORDER (BUY) | QTY | TIME | PRIORITY | PROPORTION | PRO-RATA | TOTAL |
|---|---|---|---|---|---|---|
| A | 100 | 10:01 | 50 | 33.33% | 20 | 70 |
| B | 20 | 10:02 | -- | 13.33% | 8 | 8 |
| C | 80 | 10:03 | -- | 53.33% | 32 | 32 |
| TOTAL | 200 | | 50 | | 60 | 110 |

*FIG. 3*
*PRIOR ART*

MINIMUM ALLOCATION QUANTITY: 2 LOTS
INCOMING ORDER: SELL 110 AT 111.01
NO PRIORITY

| ORDER (BUY) | QTY | TIME | PROPORTION (%) | PRO-RATA | PR ALLOCATED | REMAINDER | TOTAL |
|---|---|---|---|---|---|---|---|
| A | 3 | 10:01 | 1 | 1 | -- | 2 | 2 |
| B | 3 | 10:02 | 1 | 1 | -- | 0 | 0 |
| C | 100 | 10:03 | 40 | 44 | 44 | -- | 44 |
| D | 128 | 10:04 | 51 | 56 | 56 | -- | 56 |
| E | 18 | 10:05 | 7 | 8 | 8 | -- | 8 |
| TOTAL | 252 | | | | 108 | 2 | 110 |

PRIORITY:
   NUMBER OF ORDERS: 3
   MIN = 20
   MAX = 50

1200

| ORDER (BUY) | TIME | PRICE | QTY | PRIORITY STATUS |
|---|---|---|---|---|
| A | 10:01 | 111.01 | 15 | -- |
| B | 10:02 | 111.01 | 30 | 30 |
| C | 10:03 | 111.01 | 95 | 50 |
| D | 10:04 | 111.01 | 100 | 50 |
| E | 10:05 | 111.01 | 50 | -- |
| TOTAL | | | | |

PRIORITY:
   QUANTITY = 120
   MIN = 20
   MAX = 50

1210

| ORDER (BUY) | TIME | PRICE | QTY | PRIORITY STATUS |
|---|---|---|---|---|
| A | 10:01 | 111.02 | 15 | -- |
| B | 10:02 | 111.02 | 30 | 30 |
| C | 10:03 | 111.02 | 95 | 50 |
| D | 10:04 | 111.01 | 30 | 30 |
| E | 10:05 | 111.01 | 50 | 10 |
| TOTAL | | | | |

PRIORITY:
　　NUMBER OF ORDERS: 3
　　MIN = 20
　　MAX = 50

1300

| ORDER (BUY) | TIME | PRICE | QTY | PRIORITY STATUS |
|---|---|---|---|---|
| A | 10:00:01 | 111.02 | 15 | -- |
| B | 10:00:02 | 111.02 | 30 | 30 |
| C | 10:00:03 | 111.02 | 95 | 50 |
| D | 10:00:04 | 111.02 | 100 | 50 |

PRIORITY:
　　NUMBER OF ORDERS: 3
　　MIN = 20
　　MAX = 50

1310

| ORDER (BUY) | TIME | PRICE | QTY | PRIORITY STATUS |
|---|---|---|---|---|
| E | 10:00:05 | 111.03 | 60 | 50 |
| A | 10:00:01 | 111.02 | 15 | -- |
| B | 10:00:02 | 111.02 | 25 | 25 |
| C | 10:00:03 | 111.02 | 45 | 45 |
| D | 10:00:04 | 111.02 | 50 | -- |

PRIORITY:
   NUMBER OF ORDERS: 3
   MIN = N/A
   MAX = N/A
   TIME = 10:00:04

1400

| ORDER (BUY) | TIME | PRICE | QTY | PRIORITY STATUS |
|---|---|---|---|---|
| A | 10:00:01 | 111.01 | 50 | |
| B | 10:00:02 | 111.01 | 30 | 50 |
| C | 10:00:03 | 111.01 | 60 | 30 |
| D | 10:00:04 | 111.01 | 100 | 60 |

PRIORITY:
   NUMBER OF ORDERS: 3
   MIN = N/A
   MAX = N/A
   TIME = 10:01:04

1404

| ORDER (BUY) | TIME | PRICE | QTY | PRIORITY STATUS |
|---|---|---|---|---|
| A | 10:00:01 | 111.01 | 50 | 0 |
| B | 10:00:02 | 111.01 | 30 | 0 |
| C | 10:00:03 | 111.01 | 60 | 0 |
| D | 10:00:04 | 111.01 | 100 | -- |

INCOMING ORDER: 500 LOTS
FIFO: 30%

PRIORITY:
NUMBER OF ORDERS: 2
MIN = 20
MAX = 50

↙ 1500

| ORDER (BUY) | QTY | PRI. ALLOCATION | PREF. ALLOCATION | Q<sub>REMAINING</sub> | FIFO | Q<sub>REMAINING</sub> | % PRO-RATA | PRO-RATA | REMAINDER | TOTAL |
|---|---|---|---|---|---|---|---|---|---|---|
| A | 80 | 50 | -- | 30 | 30 | 0 | 0 | 0 | -- | 80 |
| B | 30 | 30 | -- | 0 | -- | 0 | 0 | 0 | -- | 30 |
| C | 100 | -- | 42 (10%) | 58 | 58 | 0 | 0 | 0 | -- | 100 |
| D | 110 | -- | -- | 110 | 19 | 91 | 27.74% | 69 | 2 | 90 |
| E | 150 | -- | 21 (5%) | 129 | -- | 129 | 39.33% | 98 | -- | 119 |
| F | 90 | -- | -- | 90 | -- | 90 | 27.44% | 68 | -- | 68 |
| G | 18 | -- | -- | 18 | -- | 18 | 5.49% | 13 | -- | 13 |
| TOTAL | 578 | 80 | 63 | 435 | 107 | 328 | 100% | 248 | 2 | 500 |

|  |  |  | BIDS | OFFER |
|---|---|---|---|---|
| TIME | PRICE | ORDER | QTY @ TIME 1 | QTY @ TIME 1 |
| 10:02:01 | 111.08 | A | -- | 25 |
| 10:02:02 | 111.07 | B | -- | 15 |
| 10:02:03 | 111.06 | C | -- | 10 |
| 10:02:04 | 111.05 | D | 3 | -- |
| 10:02:05 | 111.04 | E | 5 | -- |
| 10:02:06 | 111.03 | F | 15 | -- |
| 10:02:06 | 111.02 | G | 20 | -- |
| 10:02:07 | 111.01 | H | 15 | -- |

1642 → TIME, 1644 → PRICE, 1646 → QTY @ TIME 1 (BIDS), 1648 → QTY @ TIME 1 (OFFER), 1640

|  |  |  | BIDS | OFFER |
|---|---|---|---|---|
| TIME | PRICE | ORDER | QTY @ TIME 2 | QTY @ TIME 2 |
| 10:02:01 | 111.08 | A | -- | 40 |
| 10:02:02 | 111.07 | B | -- | 25 |
| 10:02:03 | 111.06 | C | -- | 15 |
| 10:02:04 | 111.05 | D | -- | 5 |
| 10:02:05 | 111.04 | E | -- | 5 |
| 10:02:06 | 111.03 | F | 5 | -- |
| 10:02:06 | 111.02 | G | 20 | -- |
| 10:02:07 | 111.01 | H | 15 | -- |

1642 → TIME, 1644 → PRICE, 1650 → QTY @ TIME 2 (BIDS), 1652 → QTY @ TIME 2 (OFFER), 1640'

*FIG. 16B*

|  |  |  | BIDS | OFFER |
|---|---|---|---|---|
| TIME | PRICE | ORDER | QTY @ TIME 1 | QTY @ TIME 1 |
| 10:02:01 | 111.08 | A | -- | 25 |
| 10:02:02 | 111.07 | B | -- | 15 |
| 10:02:03 | 111.06 | C | -- | 10 |
| 10:02:04 | 111.05 | D | 5 | -- |
| 10:02:05 | 111.04 | E | -- | -- |
| 10:02:06 | 111.03 | F | 15 | -- |
| 10:02:06 | 111.02 | G | 20 | -- |
| 10:02:07 | 111.01 | H | 15 | -- |

1680

1642 — 1644 — 1682 — 1684 —

|  |  |  | BIDS | OFFER |
|---|---|---|---|---|
| TIME | PRICE | ORDER | QTY @ TIME 2 | QTY @ TIME 2 |
| 10:02:01 | 111.08 | A | -- | 25 |
| 10:02:02 | 111.07 | B | -- | 15 |
| 10:02:03 | 111.06 | C | -- | 10 |
| 10:02:04 | 111.05 | D | -- | -- |
| 10:02:05 | 111.04 | E | 10 | -- |
| 10:02:06 | 111.03 | F | 5 | -- |
| 10:02:06 | 111.02 | G | -- | -- |
| 10:02:07 | 111.01 | H | 15 | -- |

SYSTEMS AND METHODS FOR MATCHING ONE OR MORE INCOMING ORDER TO A STANDING ORDER AS A FUNCTION OF AN INNER MARKET PARAMETER

CROSS REFERENCE TO RELATED APPLICATIONS

This patent relates to co-pending U.S. patent application Ser. No. 11/729,578, titled "SYSTEM AND METHOD OF ALLOCATING AN INCOMING ORDER TO STANDING ORDERS", filed on Mar. 29, 2007, the content of which is incorporated herein in its entirety for all purposes.

This patent further relates to co-pending U.S. patent application Ser. No. 12/246,775, titled "SYSTEM AND METHOD FOR MATCHING ONE OR MORE INCOMING ORDER TO A STANDING ORDER BASED ON MULTIPLE ORDER PRIORITY", filed contemporaneously herewith; co-pending U.S. patent application Ser. No. 12/246,796, titled "SYSTEM AND METHOD FOR MATCHING ONE OR MORE INCOMING ORDER TO A STANDING ORDER BASED ON MULTI-LEVEL ALLOCATION", filed contemporaneously herewith; co-pending U.S. patent application Ser. No. 12/246,818, titled "SYSTEM AND METHOD FOR MATCHING ONE OR MORE INCOMING ORDER TO A STANDING ORDER BASED ON MULTIPLE ORDER PRIORITY ALLOCATION", filed contemporaneously herewith; a d co-pending U.S. patent application Ser. No. 12/246,832, titled "SYSTEM AND METHOD FOR MATCHING ONE OR MORE INCOMING ORDER TO A STANDING ORDER BASED ON TIME ORDER PRIORITY ALLOCATION", filed contemporaneously herewith, the contents of which are incorporated herein in their entirety for all purposes.

BACKGROUND

An exchange provides one or more markets facilitating and/or enabling the purchase and sale of various types of products including financial instruments such as stocks, bonds, futures contracts, options, cash, and other similar instruments. Agricultural products and commodities are also examples of products traded on such exchanges. A futures contract is a product that is a contract for the future delivery of another financial instrument such as a quantity of grains, metals, oils, bonds, or cash. Generally, each exchange establishes, for each market provided thereby, a specification that defines at least the product(s) traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates.

Products on an exchange are traded in an environment where the exchange provides a location for buyers and sellers to meet and negotiate a price for a quantity of a product. This environment may be an open outcry or on an electronic trading platform (e.g., an electronic exchange) where traders use software to send an order to the trading platform, or a combination of both. The order identifies the product, the quantity of the product the trader wishes to trade, a price at which the trader wishes to trade the product, and a direction of the order (i.e., whether the order is a bid to buy or an offer to sell). The trading platform may, in turn, allocate resting orders against: aggressor orders; stop orders; market orders; limit orders and/or any other type of known or foreseeable orders. Other products are traded in an over-the-counter market (e.g., where products are not listed on an exchange).

In an electronic trading platform, a trading host on the trading platform monitors incoming orders and attempts to identify (i.e., match) one or more previously received orders stored in an order book database, wherein each identified order is contra to the incoming order and has a favorable price relative to the incoming order. In particular, if the incoming order is a bid then the identified order is an offer at a price that is identical to or less than the bid price. Similarly, if the incoming order is an offer at a particular price, the identified order is a bid at a price that is identical to or greater than the offer price. Unmatched orders are placed in an open order book to await receipt of a contra order, these waiting order are said to be "resting orders".

In one embodiment, the trading host calculates an open price or "indicative opening price" for a given product based on the overlap of orders (both bids and offers) present within the trading system prior to the market open. The mean price or indicative price will be updated periodically, i.e., every minute, every thirty seconds, every two minutes, etc. If the volume of the orders present within the trading system prior to the market open is such that the open price could be one of two prices, the price closest to the previous settlement price is selected to be the open price. If the trading host determines that overlap exists between bids and offers in a contract, the trading host totals the respective bids and the respective offers within the determined overlap range. The totaled bids are then analyzed by the trading host to determine where and at what price the highest total quantity on the bid "flips" or changes to a higher total quantity of the offer. The identified price is selected to be the indicative opening price. As previously discussed, this indicative opening price will be updated periodically, i.e., every minute, every thirty seconds, every two minutes, etc., until the opening of the market upon which the indicative opening price become the open price.

Upon identification (matching) of a contra order, a minimum of the quantities associated with the identified order and the incoming order is matched and at least the minimum quantities of each of the identified and incoming orders become two halves of a matched trade that is sent to a clearinghouse. The trading host considers each identified order in this manner until either all of the identified orders have been considered or all of the quantity associated with the incoming order has been matched. If any quantity of the incoming order remains, an entry is created in the order book database and information regarding the incoming order is recorded therein.

Traders access the markets on a trading platform using trading software that receives and displays at least a portion of the order book for a market, enables a trader to provide parameters for an order for the product traded in the market, and transmits the order to the trading platform. The trading software typically utilizes a graphical user interface to display at least a price and quantity of some of the entries in the order book associated with the market. The number of entries of the order book displayed is generally preconfigured by the trading software, limited by the trading platform, customized by the user or some combination thereof. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

Regardless of the specific configuration of a particular trading platform, each of the trading platforms will typically include one or more matching algorithms, methods and schemes for allocating incoming orders to other incoming or resting orders. Because incoming orders will rarely be identical to, i.e., have the same quantities, prices and other variables, the other incoming or resting orders, the algorithms, methods and schemes are, for example, intended: to allocate orders to promote and/or reward market makers; to assure an equitable distribution of the incoming order; and to regulate the trading volume.

I. First-In First-Out (FIFO) Algorithm

If the trading host identifies multiple orders having an identical price and which are contra to the incoming order, assuming that the price of the multiple orders is favorable to the price of the incoming order, the trading host allocates the quantity of the incoming order among such identified orders in accordance with prioritization and allocation algorithms as defined in the product specification. A time priority algorithm such as a first-in first-out (FIFO) allocation principle or algorithm considers each identified order sequentially in accordance with when the identified order was received. The quantity of the incoming order is matched to the quantity of the identified order received earliest, then quantities of the next earliest, and so on until the quantity of the incoming order is exhausted.

FIG. 1 relates to an embodiment of a FIFO allocation algorithm that illustrates how an incoming order to sell one hundred (100) lots of a product at a price of 111.01/lot received by the trading host is allocated to standing orders. Table 100 shows orders A to E that the trading host has identified in the order book that are contra to and that have a favorable price compared to the incoming order. Rows of the table 100 show information regarding standing orders A through E in the order book. A column 104 shows the price of each order, a column 106 shows the time each order was received, and a column 108 shows the quantity requested by each order. A column 110 shows the portion of the quantity of the incoming order allocated to each of the standing orders A to E. In particular, the thirty (30) units requested in order A are allocated first because the order A has the most favorable price (111.03). The remaining seventy (70) units of the incoming order are allocated to the orders B to E in accordance with the time they were received because such orders are all at the same price. Therefore, the orders B and C are allocated fifty (50) and twenty (20) lots or units of the remaining seventy (70) lots or units of the incoming order, respectively. Because the quantity of the incoming order is exhausted, the remainder of the standing order C, and all of the standing orders D and E are not allocated any portion of the incoming order and remain a resting orders in the order book.

II. Pro-Rata Algorithm

Some market specifications define the use of a pro-rata allocation algorithm or principle, wherein a quantity of an incoming order is allocated proportionally to each of plurality of identified orders.

FIG. 2 relates to a pro-rata algorithm that illustrates an example of how an incoming order to sell one hundred (100) lots of a product with a price of 111.01/lot is allocated among standing orders. As with the example of FIG. 1, the trading host has identified orders A to E as being contra (i.e., orders to buy) to the incoming order and having a favorable price. Further, thirty (30) lots of the incoming order are allocated to the thirty (30) lots requested in the order A first because this order has the highest bid price (i.e., is most favorable). Thereafter, the remaining seventy (70) lots are allocated to the orders B to E proportionally because these orders are at the same price. In particular, the trading host calculates (i) the total number of lots requested by the orders B to E (111 units) and (ii) calculates a proportion the quantity of each order comprises of the total. Column 202 shows the proportion corresponding to each order. The trading host calculates the portion of the remaining quantity (70) of the incoming order to allocate to each of the orders B to E by multiplying the proportion of the total requested by the order and the quantity remaining. Typically, the trading host rounds the calculated quantity to an integer and whether the trading host rounds up, down, or to a nearest integer is determined by the specification for the market. In other embodiments, if the calculated quantity is a lot of one (1), then the trading host may be configured to not allocate any order during a first pass. Instead, these one (1) lot fills may be allocated, for example, on subsequent FIFO fills. Any quantity of the incoming order that remains after pro-rata allocation (e.g., because the trading host rounds down the calculated quantity) is allocated to any orders that have an unfilled quantity on a FIFO basis. For example, for the order B, the trading host multiplies the proportion of quantity requested by the order B (i.e., 45%) by the remaining quantity (70) and thus allocates thirty-two (32) lots of the remaining seventy (70) lots to this order. Column 204 shows the quantity of the incoming order allocated to each of the orders A to E.

Some trading platforms provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some trading platforms cap the quantity of an incoming order that is allocated to a standing order on the basis of a priority for certain markets. In addition, some trading platforms may give a preference to orders submitted by a trader who is designated as a market maker for the product. Other trading platforms may use other criteria to determine whether orders submitted by a particular trader are given a preference. Typically, when the trading host allocates a quantity of an incoming order to a plurality of identified orders at the same price, the trading host allocates a quantity of the incoming order to any orders that have been given priority. The trading host thereafter allocates any remaining quantity of the incoming order to orders submitted by traders designated to have a preference, and then allocates any still remaining quantity of the incoming order using the FIFO or pro-rata algorithms.

III. Price Priority Algorithm

FIG. 3 illustrates an example of allocating an incoming order to sell one hundred and ten (110) lots of a product where an order that improved the price is given priority. In this example, the order that is given priority must be for a quantity of more than twenty (20) lots and a maximum of fifty (50) lots are to be allocated to on the basis of priority. In addition, suppose that the order A improved the price and is for more than twenty (20) lots. For these reasons the order A is given priority and up to fifty (50) lots of any incoming order is allocated thereto before allocation to other orders at the same price. In particular, when an order for one hundred and ten (110) lots is received, fifty (50) lots are allocated to order A and the remaining quantity (60 lots) are allocated proportionally based on the quantity of standing orders that remains after the allocation to the order A based on the priority thereof as described above.

IV. Pro-Rata/Minimum Allocation Quantity Algorithm

Pro-rata algorithms and principles utilized in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). In the example illustrated in FIG. 4, a column 402 shows the results of a pro-rata allocation of an incoming order of one hundred and ten (110) lots among orders A to E. A column 404 shows the results of applying a minimum allocation quantity that has a value of two (2) to the pro-rata allocation. In this example, the trading host rounds fractional quantities of the pro-rata allocation to the nearest integer. Because orders A and B would be allocated quantities that are less than the value of the minimum allocation quantity, the allocation to each of the orders A and B after applying the minimum allocation quantity is zero (0). The two (2) lots of the incoming order that were not allocated to orders A and B because of applying the minimum allocation quantity are allocated on a FIFO basis and because order A was received earliest, order A is allotted the entire remainder of two (2) lots (as shown in a column 406). In an alternate embodiment, the two (2) lots of the incoming order that were not allocated to orders A and B, i.e., the residual, may be allotted to largest resting order that does not meet the minimum allocation quantity. In yet another alternate embodiment, all of the residual lots which, in this example are the two (2) lots of the incoming order that were not allocated to orders A and B, may be allocated to all of the remaining lots to the resting orders that did not receive an initial allocation.

The pro-rata allocation algorithm may further include priority order functionality. Priority orders are orders that better a side of the market (a.k.a. market turner). Only one order per side of the market (buy side or sell side) can be a Priority order priority, although it is possible for neither side of the market to have a Priority order associated therewith. If a Priority order is present and the price elected or associated with the Priority order is selected, then the initial allocation is made to the Priority order. Once the quantity associated with the Priority order has been filled, the pro-rata allocation algorithm distributes the remaining orders as discussed in connection with FIG. 4. It will be understood that Priority orders may be associated with a minimum order quantity or volume and/or a maximum order quantity or cap.

V. Lead Market Marker (LMM) Allocation Algorithm

In other embodiments a Lead Market Maker (LMM) allocation algorithm is disclosed. The LMM designation is given to individuals chosen to make a two-sided market in an assigned contract. The LMM designation conveys a guaranteed allocation percentage of incoming orders to the identified individuals as well as pricing concessions in return for satisfying market obligations. The LMM allocation algorithm has two versions: with and without Priority order functionality.

VI. LMM Allocation Algorithm with Priority Order Functionality

As previously discussed, Priority orders are orders that better a side of the market (a.k.a. market turner). Only one order per side of the market (buy side or sell side) can be a Priority order priority, although it is possible for neither side of the market to have a Priority order associated therewith. If a Priority order is present and the price elected or associated with the Priority order is selected, the Priority order is matched first regardless of whether or not the order belongs to a designated LMM. If the Priority order belongs to an LMM, the order will be matched first and will not be included in the following calculations: (1) if the LMM has a single order at an elected price level, it will match an LMM's allocation percentage N % of the remaining incoming order quantity. However, the matched quantity will not exceed the LMM's order quantity. (2) If the LMM has multiple orders at an elected price level, then the LMM quantity is aggregated and will match N % of the remaining incoming order quantity. Multiple LMM orders are matched on time priority basis until N % quantity allocation is fulfilled. All remaining resting orders at an elected price level (LMM as well) are matched according to time priority. In an embodiment, a user can lose their order priority (for Priority orders) when the order is changed under any one of the following scenarios: (i) an increase in quantity; (ii) a change in price; and (iii) a change in account number.

VII. LMM Allocation Algorithm Without Priority Order Functionality

In another embodiment, if the LMM has a single order at an elected or associated price level, the LMM will match an LMM's allocation percentage N % of the incoming order quantity. However, the matched quantity will not exceed the LMM's order quantity. Alternatively, if the LMM has multiple orders at an elected price level, then the LMM quantity is aggregated and will match N % of the incoming order quantity. Multiple LMM orders are matched on Time Priority basis until N % quantity allocation is fulfilled. However, the LMM's allocated match quantity cannot exceed their aggregated order size quantity. All remaining resting orders at an elected price level (LMM included) are matched according to Time Priority. LMM allocation will not apply until after the market opening sequence is complete, with opening matching occurring on a FIFO basis. The opening price is calculated by maximizing match quantities in relation to buy/sell pressure.

In other embodiments, an order matching algorithm may include a distributed allocation strategy that utilizes time priority elements for market-making orders and/or orders within a tick of the market (provided no resting orders remain at the same price). In operation, orders are initially processed on a time priority basis, the remaining resting orders are then allocated according to the following process: (1) each resting order at a given price receives a one lot allocation unless there is insufficient quantity and then the one lot allocation is conducted randomly; (2) the remaining resting orders are filled based on quantity allocation; and (3) any remaining quantity are allocated to the largest outstanding order or orders.

U.S. Pat. No. 7,225,153 discloses digital options having demand-based, adjustable returns, and trading exchange therefor. In particular, the patent discloses methods and systems for trading and investing in groups of demand-based adjustable return ("DBAR") contingent claims, including digital options, and for establishing markets and exchanges for such claims. The advantages of the discloses methods and systems, as applied to the establishment and operation of a DBAR digital options exchange, include the ability to offer investments whose profit and loss scenarios are comparable to those for digital options or other derivatives in traditional securities markets, without the need for options or derivatives sellers or order-matching of conventional markets. A DBAR digital options exchange of the disclosed methods and systems can also offer conditional investments, or limit orders, in which an investment in a state of a DBAR contingent claim (such as the price of an underlying asset or index) can be executed or withdrawn in response to the implied probability of the occurrence of that state.

U.S. Pat. No. 7,233,923 discloses systems and methods for matching desired purchases and sales of mismatched items. The disclosed systems and methods compare the requirements of potential buyers and sellers of items against those of sets of other potential buyers and sellers of items to construct transaction sets that will enable an optimal transaction or set of transactions for the parties involved. The disclosed systems and methods may be used to match purchases and sales of any items, such as goods, services, financial instruments, and property interests (e.g., ownership interests in real property, possessory interests in personal property, etc.).

Allocation algorithms used by the trading host for a particular market may affect the liquidity of the market. Specifically, some allocation algorithms may encourage traders to submit more orders, where each order is relatively small. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets.

BRIEF DESCRIPTION OF THE FIGURES

FIG. 1 illustrates an example of allocating an incoming order to standing orders using a known FIFO algorithm;

FIG. 2 illustrates an example of allocating an incoming order to standing orders using a known pro-rata algorithm;

FIG. 3 illustrates an example of allocating an incoming order to standing orders in accordance with a known priority algorithm;

FIG. 4 illustrates an example of allocating an incoming order to standing orders in accordance with a known pro-rata algorithm that imposes a minimum allocation quantity;

FIG. 12A illustrates an example of multiple standing orders having priority;

FIG. 12B illustrates another example of multiple standing orders having priority;

FIGS. 13A and 13B illustrate an example of the priority of standing orders being changed upon receipt of an additional order;

FIGS. 14A and 14B illustrate an example of the priority of standing orders being revoked;

FIG. 15 illustrates an example of allocation of an incoming order to resting orders in accordance with priority, preferences, FIFO allocation, and pro-rata allocation;

FIGS. 16B and 16C illustrate tabular examples of allocation of an incoming order according to an inner/outer market allocation algorithm;

DETAILED DESCRIPTION

The present disclosure relates to systems, methods, process and devices for matching and allocating orders in an electronic trading environment.

I. First-In First-Out (FIFO)/Pro-Rata Split

In one embodiment a matching algorithm may be configured to allocate an incoming order according to a combination of FIFO and pro-rata principles. For example, a portion of an incoming order may be allocated based on FIFO principles while the remainder of the incoming order may be allocated based on pro-rata principles.

Figure 5:
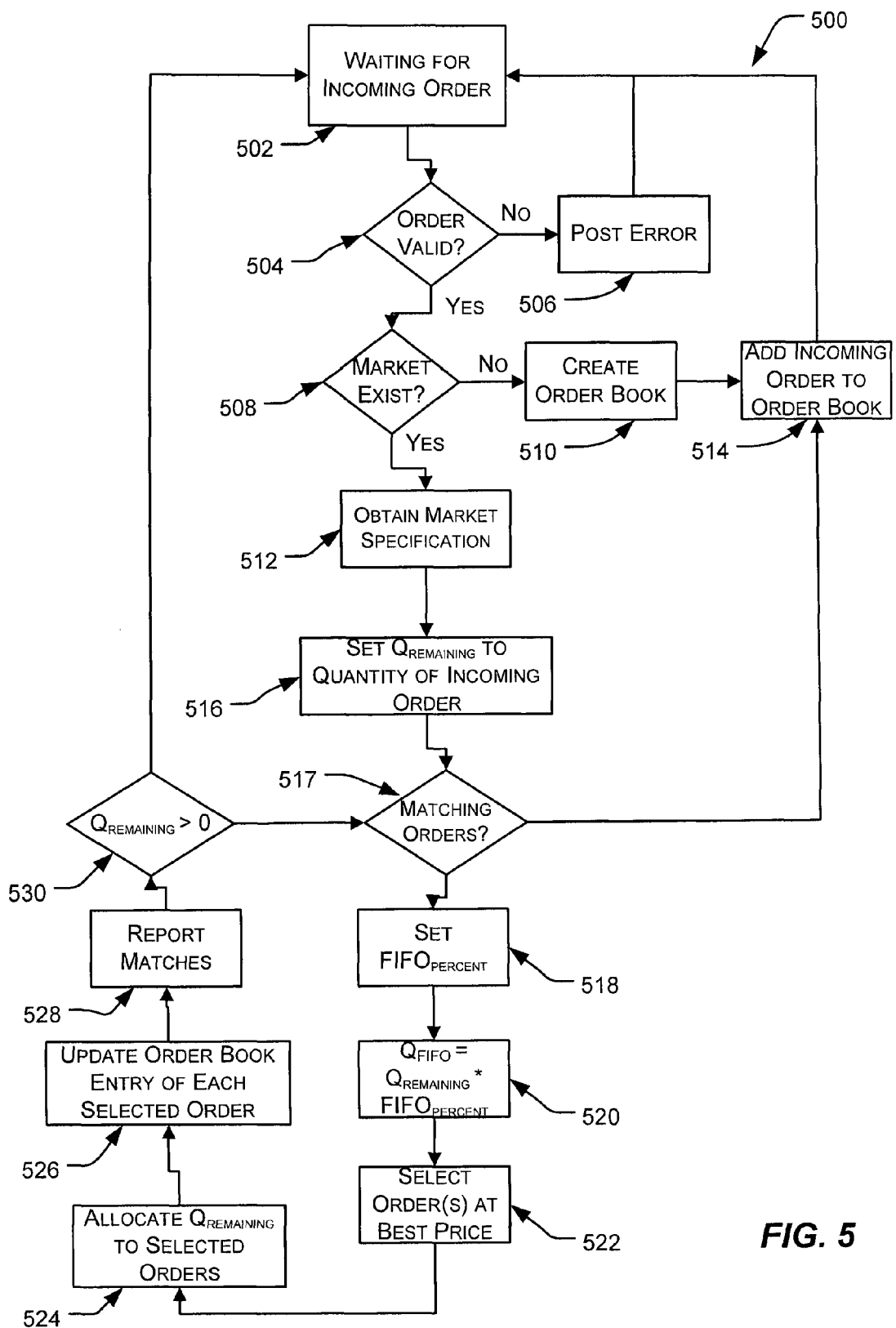
FIG. 5 illustrates an embodiment of how a trading host may process an incoming order.

FIG. 5 illustrates a FIFO matching algorithm 500 detailing a process by which a trading host may allocate an incoming order to identified orders. At block 502, the trading host may wait, or continue to wait, to receive an order that is either a bid or an offer to buy or sell, respectively, a quantity of a product.

At block 504, in response to receiving an order, the incoming order may be validated by the FIFO matching algorithm 500. Typically, validation includes verifying that the trader submitting the received order is authorized to trade in the market in which the product is traded, and that the incoming order conforms to the specifications for the market in which the product trades.

At block 506, in response to a determined invalid order, the FIFO matching algorithm 500 posts an error to the trading software utilized by the trader submitting the order. At this point, the FIFO matching algorithm 500 and the trading host returns to the block 502 to wait for another incoming order.

At block 508, in response to a determined valid order, the FIFO matching algorithm 500 checks or queries a database (which may be the database 2116 shown in FIG. 21A) maintained by the trading host to determine if an order book (i.e., a market) exists for the incoming order. If the market does not exist, the FIFO matching algorithm 500 proceeds to block 510, otherwise the FIFO matching algorithm 500 proceeds to block 512.

At block 510, the FIFO matching algorithm 500 may create a new order book for the market. At block 514, the FIFO matching algorithm 500 may create an entry in the newly created order book for the incoming order. The FIFO matching algorithm 500 and/or the trading host thereafter returns to the block 502 to wait for another order to arrive.

At block 512, the specifications for the market such as, for example, traded product, delivery month, strike price, etc., may be obtained or determined. For example, the FIFO matching algorithm 500 queries or reads information such as the specifications for the market from a database (see database 2116 shown in FIG. 21A) or file structure (see memory 2120 shown in FIG. 21B) stored or maintained on computers or terminals utilized by the trading platform. In some embodiments, the database that stores the specifications for the market may also store the order book. In other embodiments, separate databases may be utilized to store the specifications for the market and the order book. In still other embodiments, the specifications for the market may be obtained by the FIFO matching algorithm 500 via a network and/or Internet or other secure connection to a remote system.

At block 516, the FIFO matching algorithm 500 sets a value $Q_{remaining}$ to equal the quantity of products specified in the incoming order received at block 502.

At block 517, the FIFO matching algorithm 500 queries the order book, which may have been established at block 510, to determine the existence of any orders, having a favorable price, contra to the incoming order. If no such orders are identified, the FIFO matching algorithm 500 proceeds to the block 514 and creates an entry for the incoming order in the order book. If an existing order having a favorable price, contra to the incoming order is identified, then the FIFO matching algorithm 500, at block 518 may set a FIFO percentage $FIFO_{percent}$ that represents the percentage of the incoming order that should be allocated using FIFO principles.

The FIFO matching algorithm 500 may determine the value $FIFO_{percent}$ by querying the database (see FIG. 21A), obtaining the value from another communicatively connected system, receiving an input from a user or any other known or foreseeable means. In some markets, $FIFO_{percent}$ may be fixed and defined by the market specification. In other markets, $FIFO_{percent}$ may be varied during the course of the trading session in accordance with metrics associated with the market. In other embodiments, $FIFO_{percent}$ is determined in accordance with a measure of activity in the market.

At block 518, the FIFO matching algorithm 500 may utilize the criteria of the market specification to determine the value of $FIFO_{percent}$. For example, in some embodiments, the FIFO matching algorithm 500 may set a first, large value of $FIFO_{percent}$ when there are many orders in the market, and a second, low (or lower) value of $FIFO_{percent}$ when there are few orders in the market. In an embodiment, a high value of $FIFO_{percent}$ may be utilized if the sum of the quantities associated with the orders in the market at the best price is high; otherwise, a relatively low value of $FIFO_{percent}$ may be utilized. In another embodiment, the $FIFO_{percent}$ may be determined dynamically as the number of orders in the market or the quantities associated with the orders varies. It will be understood, that other metrics and indicators of market activity may be utilized in other embodiment to determine the value of $FIFO_{percent}$.

At block 520, the FIFO matching algorithm 500 may determine $Q_{FIFO}$, that is the quantity of the incoming order that is to be allocated using a FIFO algorithm, by multiplying $Q_{remaining}$ with $FIFO_{percent}$. It should be apparent that if $FIFO_{percent}$ is one-hundred percent (100%) then the FIFO matching algorithm 500 implemented by the trading host exclusively utilizes FIFO principles to allocate the quantity of the incoming order. In addition, if the value of $FIFO_{percent}$ is zero percent (0%) then none of the quantity the incoming order is allocated utilizing the FIFO algorithm and the entire quantity is allocated using pro-rata principles and/or algorithms described above or other algorithms designated for the market.

At block 522, the FIFO matching algorithm 500 identifies and selects all of the orders from the order book that have the best price and that have not had any quantity of the incoming order allocated thereto.

At block 524, the FIFO matching algorithm 500 allocates $Q_{remaining}$ the quantity of the product specified by the incoming order. Upon completion of the allocation, $Q_{remaining}$ is updated to reflect the allocated quantity.

At block 526, the FIFO matching algorithm 500 updates the order book corresponding to each of the identified and selected orders discussed in connection with block 522 to reflect the allocated allocation received from the incoming order.

At block 528, the FIFO matching algorithm 500 and the trading host reports, for each of the identified and selected orders to which a portion of the incoming order was allocated, a match between the selected order and the incoming order to the clearinghouse, the trader who submitted the selected order, and the trader who submitted the incoming order. In an embodiment, the match may be recorded in a database maintained by the trading platform.

At block 530, the FIFO matching algorithm 500 may check to determine if the order quantity represented by $Q_{remaining}$ is greater than zero. If the determined value of $Q_{remaining}$ is greater than zero (i.e., the quantity of the incoming order has not been exhausted) then, the FIFO matching algorithm 500 proceeds to the block 517 to determine the existence of any remaining orders, having a favorable price, contra to the incoming order. If the determined value of $Q_{remaining}$ equals than zero (0), then the FIFO matching algorithm 500 may proceed to block 502 to wait for another incoming order.

A. Price Allocation Algorithm

In one embodiment a matching algorithm may be configured to allocate an incoming order according to a price priority criterion in conjunction with FIFO and pro-rata principles. For example, an incoming order or a portion of an incoming order may be identified as having a best or high price and may, in turn, be designated as a price priority order. Lots may then be initially allocated based on the price priority while the remainder of the incoming order may be allocated based on, for example, a preference criterion, FIFO and/or pro-rata principles.

Figure 6A:
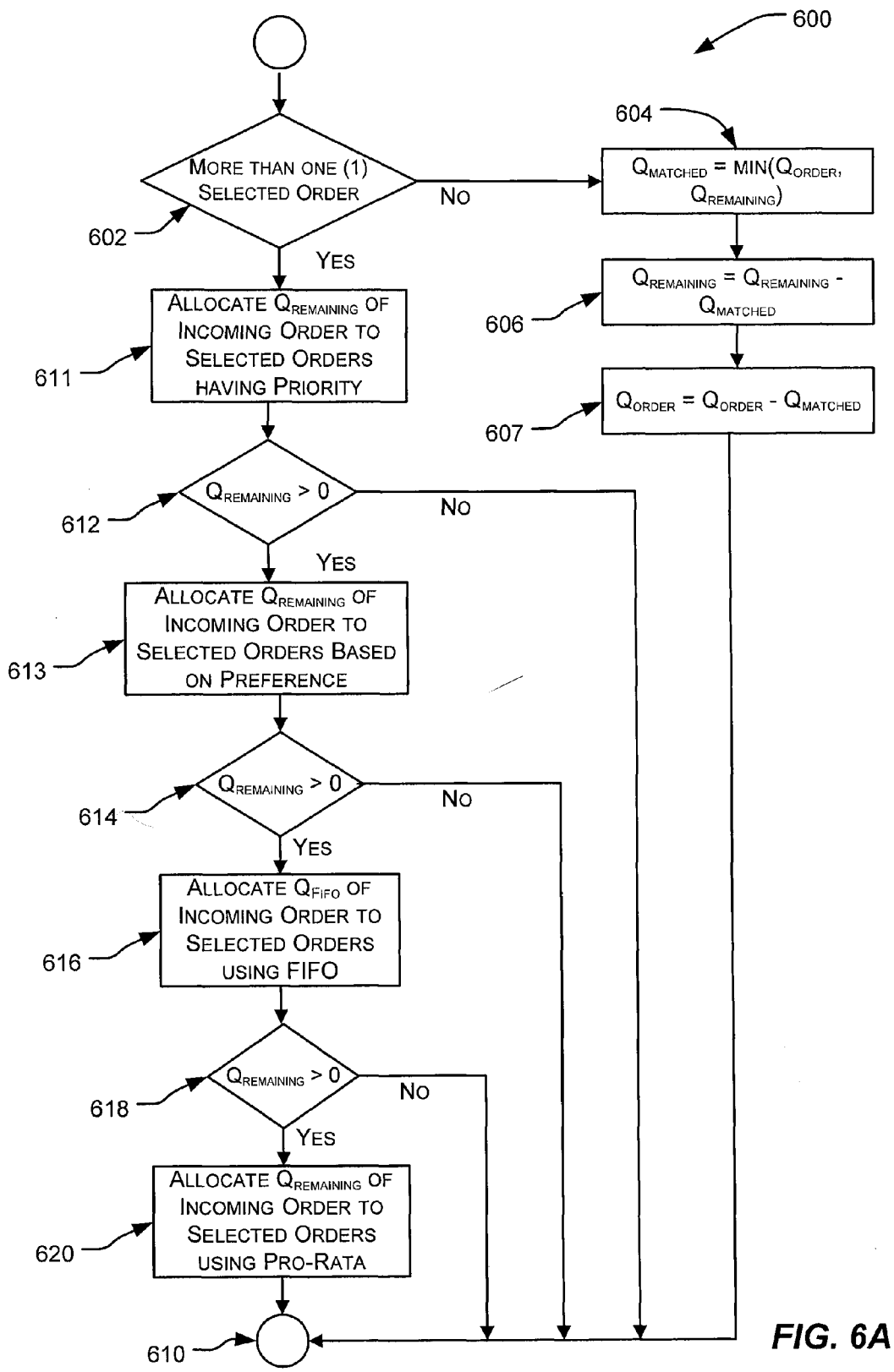
FIG. 6A illustrates an embodiment of how a quantity of an incoming order may be allocated to standing orders.

FIG. 6A illustrates a price allocation algorithm 600 that may be implemented at the block 524 (see FIG. 5) of the FIFO matching algorithm 500. The price allocation algorithm 600 details another matching or allocation scheme for allocating or distributing the orders represented by $Q_{remaining}$ according to the best price.

At block 602, the price allocation algorithm 600 may determine whether more than one (1) order has been selected. If a single order is selected, then at block 604 the price allocation algorithm 600 determines a quantity of the incoming order that is to be matched $Q_{matched}$ to the contra or resting order. $Q_{matched}$ may be calculated determining the minimum of the quantity of product specified by the selected order $Q_{order}$ and the quantity of the incoming order that remains to be allocated $Q_{remaining}$.

At block 606, the price allocation algorithm 600 updates the value $Q_{remaining}$ by subtracting the value $Q_{matched}$.

At block 607, the price allocation algorithm 600 updates the quantity of the selected order that remains $Q_{order}$ by subtracting $Q_{matched}$. Upon completion of the processing represented by the block 607, it will be apparent one of the values $Q_{matched}$ or $Q_{remaining}$ will equal zero (0). The price allocation algorithm 600 may proceed to block 610 where the matching or allocation to the selected order is complete and other orders may be considered.

At block 611, the price allocation algorithm 600, allocates the quantity of the incoming order $Q_{remaining}$ to the selected orders in accordance with any priority criteria defined by the market specification for the product.

At block 612, the price allocation algorithm 600, determines if any quantity of the incoming order represented by $Q_{remaining}$ remains unfilled. If none remain, the price allocation algorithm 600 may proceed to block 610 where the matching or allocation to the selected order is complete and other orders may be considered.

At block 613, the price allocation algorithm 600, if $Q_{remaining}$ is greater than zero, allocates the remaining quantity to standing orders submitted by traders designated to have a preference.

At block 614, the price allocation algorithm 600 determines if any quantity of the incoming order represented by $Q_{remaining}$ remains to be allocated. If none remain, the price allocation algorithm 600 may proceed to block 610 where the matching or allocation to the selected order is complete and other orders may be considered.

At block 616, the price allocation algorithm 600 allocates the remaining quantity of the incoming order in a number of lots up to the value $Q_{FIFO}$ of the incoming order to the selected orders using the FIFO algorithm. Upon completion of the allocation, the price allocation algorithm 600 adjusts the values $Q_{FIFO}$ and $Q_{remaining}$ accordingly.

At block 618, the price allocation algorithm 600 determines if any quantity of the incoming order represented by $Q_{remaining}$. If none remain, the price allocation algorithm 600 may proceed to block 610 where the matching or allocation to the selected order is complete and other orders may be considered.

At block 620, the price allocation algorithm 600 allocates the remaining quantity $Q_{remaining}$ utilizing the pro-rata algorithm.

At the block 610 the price allocation algorithm 600 returns to the implementing block or point, in the present example block 524 shown in FIG. 5.

B. Alternate Price Allocation Algorithm

In one embodiment a matching algorithm may be configured to allocate an incoming order according to a preference criterion in conjunction with FIFO and pro-rata principles. For example, an incoming order or a portion of an incoming order may be identified as having a best or high price and may, in turn, be designated as a price priority order. Lots may then be initially allocated based on the price priority while the remainder of the incoming order may be allocated based on a preference criterion associated with, for example, a preferred trader, and the remainder of the incoming order may be allocated based on FIFO and/or pro-rata principles.

Figure 6C:
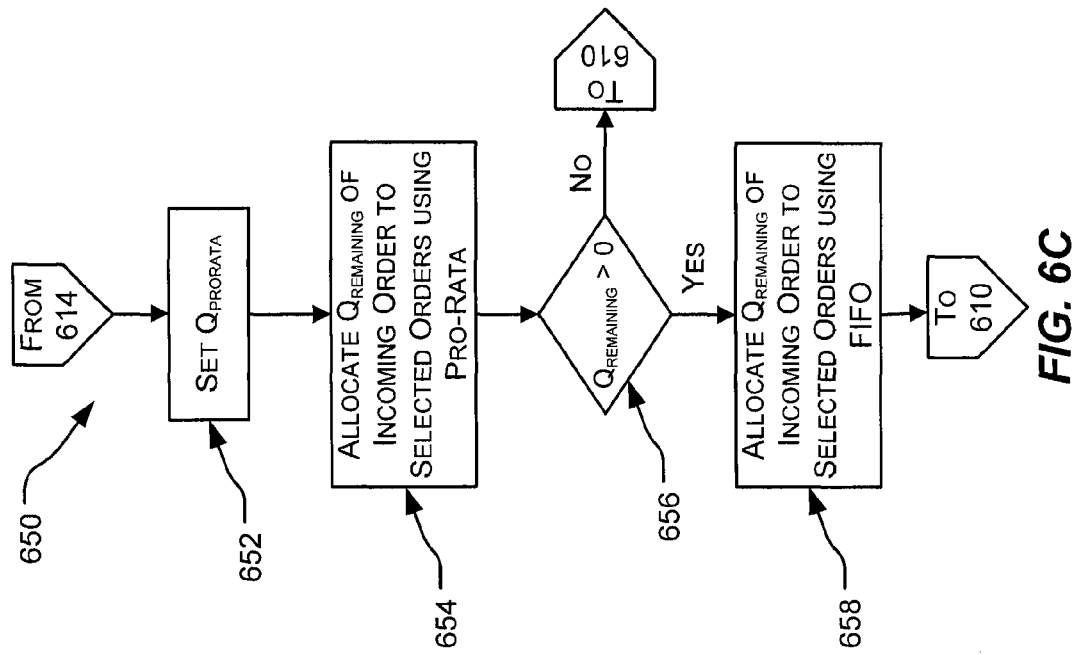
FIG. 6C illustrates yet another embodiment of how a quantity of an incoming order may be allocated to standing orders.
Figure 6B:
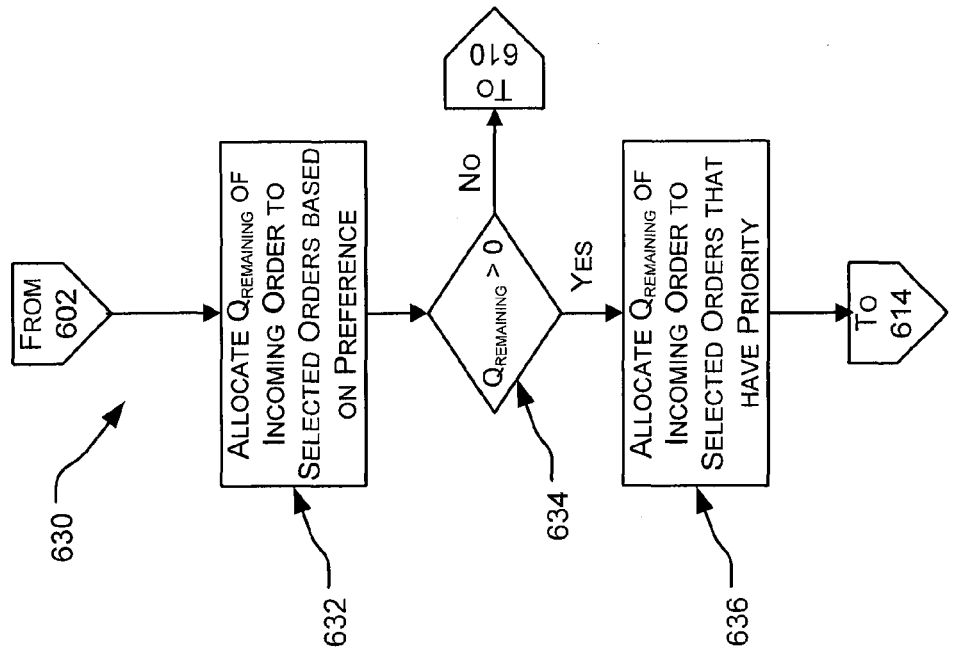
FIG. 6B illustrates another embodiment of how a quantity of an incoming order may be allocated to standing orders.

FIG. 6B illustrates an alternate price allocation algorithm 630 which may be implemented in connection with the price allocation algorithm 600 illustrated in FIG. 6A. Specifically, alternate price allocation algorithm 630 allocates a remaining quantity of an incoming order to orders submitted by preferred traders before allocating any remaining quantity of the incoming order to orders based on priority. In this embodiment, blocks 611 to 613 of the price allocation algorithm 600 illustrated in FIG. 6A may be replaced by blocks 632 to 636 of the alternate price allocation algorithm, 630. Thus, if the price allocation algorithm 600 illustrated in FIG. 6A determines that more than one order has been selected then processing proceeds to the block 632, which allocates the quantity $Q_{remaining}$ of the incoming order to those selected orders submitted by preferred traders (e.g., according to the alternate price allocation algorithm 630).

At block 634, the alternate price allocation algorithm 630 may determine if any quantity of the incoming order represented by $Q_{remaining}$. If none remain, the alternate price allocation algorithm 630 may proceed to block 610 when the matching or allocation to the selected order is complete and other orders may be considered as illustrated in FIG. 6A.

At block 636, the alternate price allocation algorithm 630 allocates any quantity of the incoming order represented by $Q_{remaining}$ on the basis of priority. The alternate price allocation algorithm then proceeds to block 614 illustrated in FIG. 6A.

C. Pro-Rata Allocation Algorithm

In one embodiment a matching algorithm may be configured to allocate an incoming order according to a combination of pro-rata principles and FIFO principles. For example, an incoming order or a portion of an incoming order may be initially allocated based on pro-rata principles while the remainder of the incoming order may be allocated based on FIFO principles.

FIG. 6C illustrates a pro-rata allocation algorithm 650 which may be implemented in connection with the price allocation algorithm 600 illustrates in FIG. 6A. In particular, the exemplary pro-rata allocation algorithm 650 allocates a remaining quantity of the incoming order using the pro-rata algorithm before allocating a quantity of the incoming order using FIFO principles or algorithms. In this embodiment, the blocks 652 to 658 of the pro-rata allocation algorithm 650 may be executed in place of blocks 616 to 620 of the price allocation algorithm 600 illustrates FIG. 6A.

At block 652, the pro-rata allocation algorithm 650 determines a value of $Q_{prorata}$ that is to be allocated using the disclosed pro-rata algorithm or scheme. In an embodiment, $Q_{prorata}$ may be the difference between $Q_{remaining}$ and $Q_{FIFO}$. In another embodiment, $Q_{prorata}$ may be developed in a manner similar to the development of the value $Q_{FIFO}$ described herein above.

At block 654, the pro-rata allocation algorithm 650 allocates a quantity equal to $Q_{prorata}$ of the incoming order to the selected orders using the pro-rata algorithm.

At block 656, the pro-rata allocation algorithm 650 determines if any quantity of the incoming order remains and, if any quantity does remain, the algorithm may proceed to block 658. If none remain, the pro-rata allocation algorithm 650 may proceed to block 610 when the matching or allocation to the selected order is complete and other orders may be considered as illustrated in FIG. 6A.

At block 658, the pro-rata allocation algorithm 650 allocates the remaining quantity $Q_{remaining}$ to the selected orders using the FIFO algorithm and may proceed to block 610 illustrated in FIG. 6A.

D. Priority Allocation Algorithm

In one embodiment a matching algorithm may be configured to allocate an incoming order according to a price priority criterion in conjunction with FIFO and pro-rata principles. For example, an incoming order or a portion of an incoming order may be designated as a price priority order if it is determined to be one of the first three (3) orders that improve the price, and lots may be allocated a function of the price priority.

Figure 7:
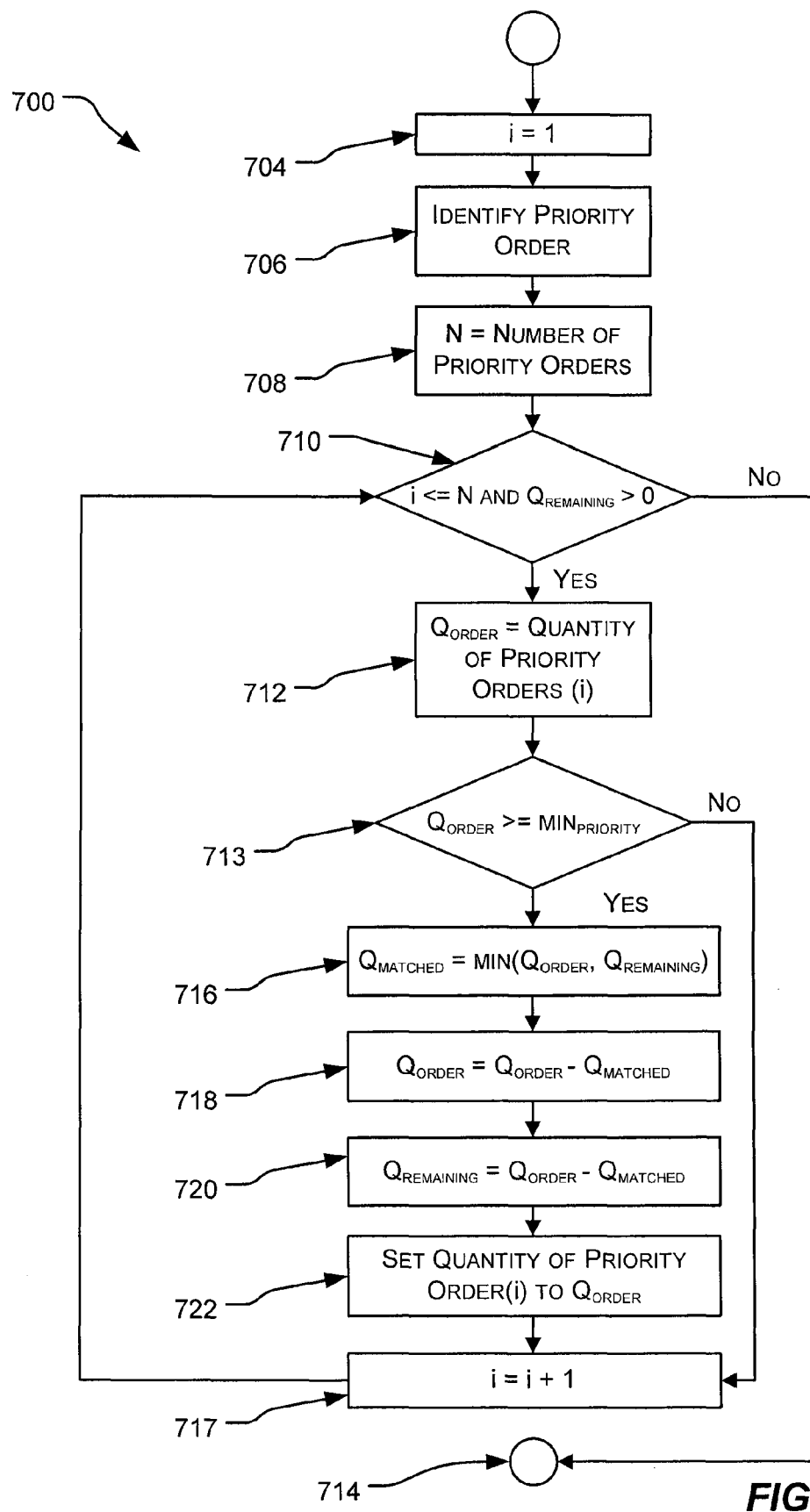
FIG. 7 illustrates an embodiment of how a quantity of an incoming order may be allocated to standing orders that have priority.

FIG. 7 illustrates an embodiment of a priority allocation algorithm 700 configured to allocate the remaining quantity $Q_{remaining}$ of the incoming order to the selected contra or standing orders that have a priority associated therewith. The priority allocation algorithm 700 may be implemented, for example, at the block 611 of the price allocation algorithm 600 illustrated in FIG. 6A. In this exemplary embodiment, the priority allocation algorithm 700 and the trading host may track a quantity of orders allocated based on a priority ($N_{priority}$) within a market during a trading session. For example, the market specification may define that the first three orders that improve the price during a trading session are to have priority. At the start of the trading session, the value of $N_{priority}$ may be set to three (3) by the priority allocation algorithm 700 and trading host. $N_{priority}$ may be decremented for each order that is allocated a quantity of an incoming order because of priority.

At block 704, priority allocation algorithm 700 sets a value of a counter i to 1.

At block 706, the priority allocation algorithm 700 identifies any orders among the selected orders (e.g., those orders selected or identified block 522 illustrated in FIG. 5) that have a priority associated therewith.

At block 708, the priority allocation algorithm 700 sets a value to the number N of the priority orders identified at block 706.

At block 710, the priority allocation algorithm 700 determines if there are additional priority orders to be considered (i<=N) and if there is a remaining quantity of the incoming order to allocate ($Q_{remaining}$>0). If additional priority orders do not exist and/or no quantity of the incoming order remains to be allocated, the priority allocation algorithm 700 proceeds to block 714 to continue allocating the remaining quantity of the incoming order.

At block 712, the priority allocation algorithm 700, upon determining the existence of additional orders and quantities to allocate, sets a value $Q_{order}$ to equal the quantity requested by the $i^{th}$ priority order. In an embodiment, the priority orders are selected sequentially in accordance with the time when each priority order was received. In another embodiment, the priority orders are selected in accordance with trader status. Other methods, scheme or algorithms of selecting the priority orders may be apparent to those with skill in the art.

At block 713, the priority allocation algorithm 700 determines if the value of $Q_{order}$ is greater than or equal to a minimum quantity $min_{priority}$ necessary to have a portion of the incoming order allocated in accordance with the priority. The value of $min_{priority}$ is typically defined by the market specification. If the value of $Q_{order}$ is at least $min_{priority}$, then processing proceeds to a block 716; otherwise processing proceeds to the block 717.

At block 716, upon determining that $Q_{order}$ is greater than or equal to the minimum quantity $min_{priority}$, the priority allocation algorithm 700 determines a value of $Q_{matched}$ to allocate to the $i^{th}$ priority order. $Q_{matched}$ is determined by calculating the minimum of the quantity of the $i^{th}$ priority order and the quantity that remains of the incoming order.

At block 718, $Q_{matched}$ is subtracted from $Q_{order}$ to calculate the quantity of the $i^{th}$ priority order that remains.

At block 720, the priority allocation algorithm 700 calculates the remaining quantity $Q_{remaining}$ of the incoming order by subtracting $Q_{matched}$ from the $Q_{order}$.

At block 722, the priority allocation algorithm 700 sets the quantity remaining $Q_{remaining}$ of the $i^{th}$ priority order to equal $Q_{order}$.

At block 717, the value of the counter i is incremented.

E. Alternate Priority Allocation Algorithm

In one embodiment a matching algorithm may be configured to allocate an incoming order according to a priority criterion based on a quantity value. For example, if the priority criterion is based on a quantity of five orders, lots may be allocated to each of the five orders according to FIFO, pro-rata or any other allocation principle or algorithm.

Figure 8:
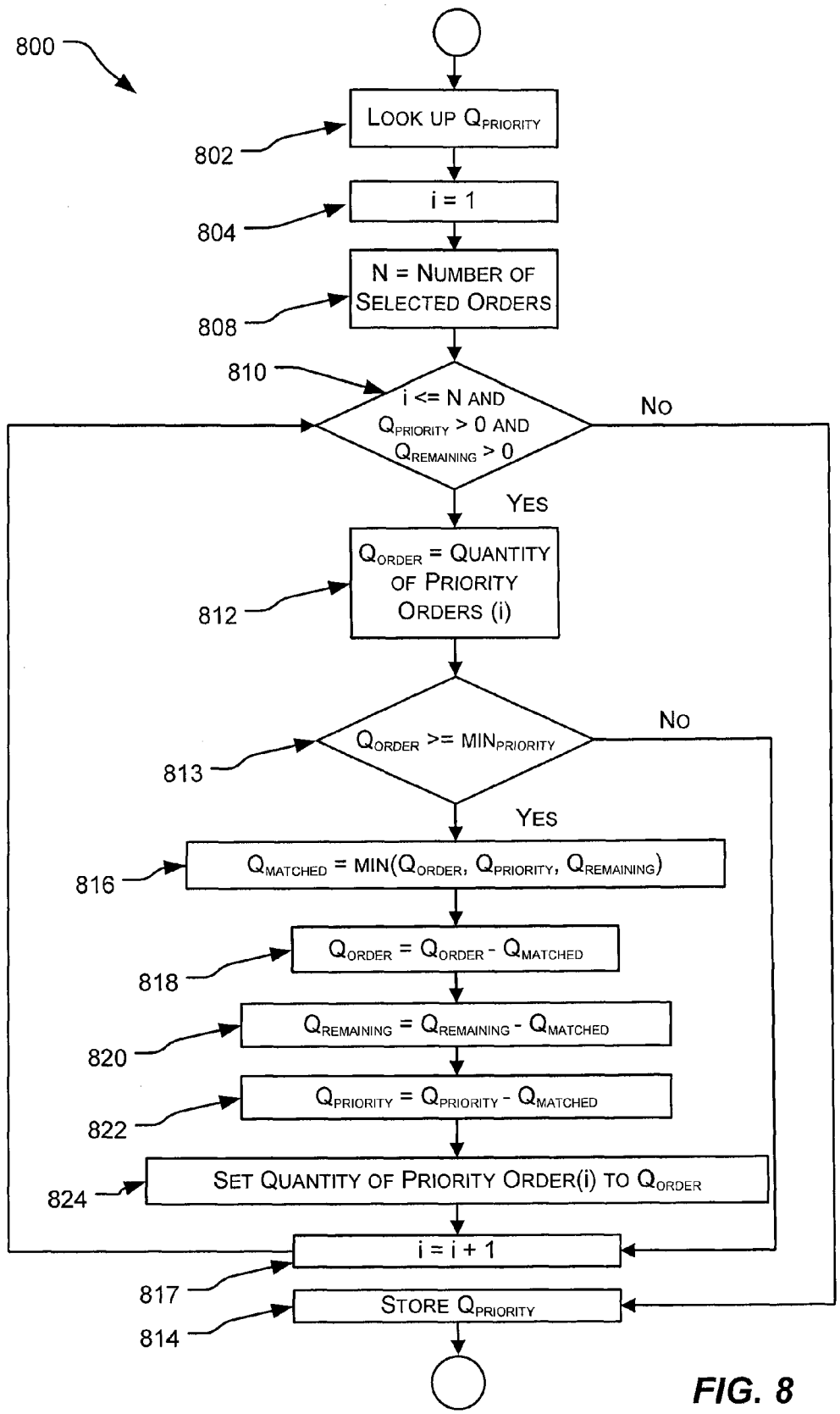
FIG. 8 illustrates another embodiment of how a quantity of an incoming order may be allocated to standing orders that have priority.

FIG. 8 illustrates an alternate priority allocation algorithm 800 to control the allocation of an incoming order to one or more selected orders having an assigned priority such that a maximum of a predetermined quantity ($Q_{priority}$) of the remaining quantity $Q_{remaining}$ are allocated to selected orders based on the priority.

At block 802, that alternate priority allocation algorithm 800 determines, queries a database or otherwise looks up the value of $Q_{priority}$ that may be allocated in accordance with the priority. In an embodiment, the alternate priority allocation algorithm 800 and the trading host tracks the number of lots within a market and during a trading session that may be allocated based on a priority. The value of $Q_{priority}$ may be stored in a database of the trading host. The value of $Q_{priority}$ may be decremented as incoming orders are allocated to orders in accordance with a priority. In another embodiment, the alternate priority allocation algorithm 800 and/or the trading host sets $Q_{priority}$ to a predetermined value defined by the trading platform for a particular market.

At block 804, the alternate priority allocation algorithm 800 initializes the value of a counter i to 1.

At block 808, the alternate priority allocation algorithm 800 sets the value of a variable N to equal to the number of orders identified as having a priority associated therewith.

At block 810, the alternate priority allocation algorithm 800 determines: (1) the existence of any remaining priority orders (i<=N); (2) existence of any predetermined quantity of unallocated priority orders ($Q_{priority}$>0); and (3) existence of any remaining quantity $Q_{remaining}$ of the incoming order to be allocated.

If any of the conditions (1) to (3) are false or otherwise do not occur and/or exist, the alternate priority allocation algorithm 800 proceeds to block 814 and stores the quantity of $Q_{priority}$.

If all three conditions are true, the alternate priority allocation algorithm 800 proceeds to block 812 and sets the value of $Q_{order}$ to the quantity of the $i^{th}$ priority order. In an embodiment, priority orders are considered in the order in which each priority order was received. In other words, the first priority order that may be selected by the alternate priority allocation algorithm 800 may be the priority order received earliest.

At block 813, the alternate priority allocation algorithm 800 compares the value of $Q_{order}$ with the value $min_{priority}$ to determine if the value of $Q_{order}$ is sufficient to be considered for allocation. If the value of $Q_{order}$ is less than $min_{priority}$, then at block 817 the counter i increments.

If the value of $Q_{order}$ is at least $min_{priority}$ then processing proceeds to a block 816; otherwise processing proceeds to a block 817.

At block 816, upon determination that the value of $Q_{order}$ is at least $min_{priority}$, the alternate priority allocation algorithm 800 calculates a matched quantity $Q_{matched}$ that is the amount of the remaining quantity $Q_{remaining}$ to allocate to the $i^{th}$ priority order without exceeding $Q_{priority}$.

At blocks 818, 820, and 822, the alternate priority allocation algorithm 800 subtracts the value $Q_{matched}$ from the values $Q_{order}$, $Q_{remaining}$ and $Q_{priority}$, respectively to reflect the quantity allocated to the $i^{th}$ order.

At block 824, the alternate priority allocation algorithm 800 sets the quantity of the $i^{th}$ order to $Q_{order}$.

At block 817, the alternate priority allocation algorithm 800 may increment the counter i and proceeds to the block 810.

At block 814, the alternate priority allocation algorithm 800 stores the quantity of $Q_{priority}$ and allocation of the remaining quantity $Q_{remaining}$ of the incoming order to the selected orders on the basis of priority is completed.

F. Preferred Trader Allocation Algorithm

In one embodiment a matching algorithm may be configured to identify orders received from a preferred trader as priority orders. For example, if an incoming order is recognized as an order from a trader identified as a preferred trader, then lots may be allocated to the priority orders according to FIFO, pro-rata or any other allocation principle or algorithm.

Figure 9:
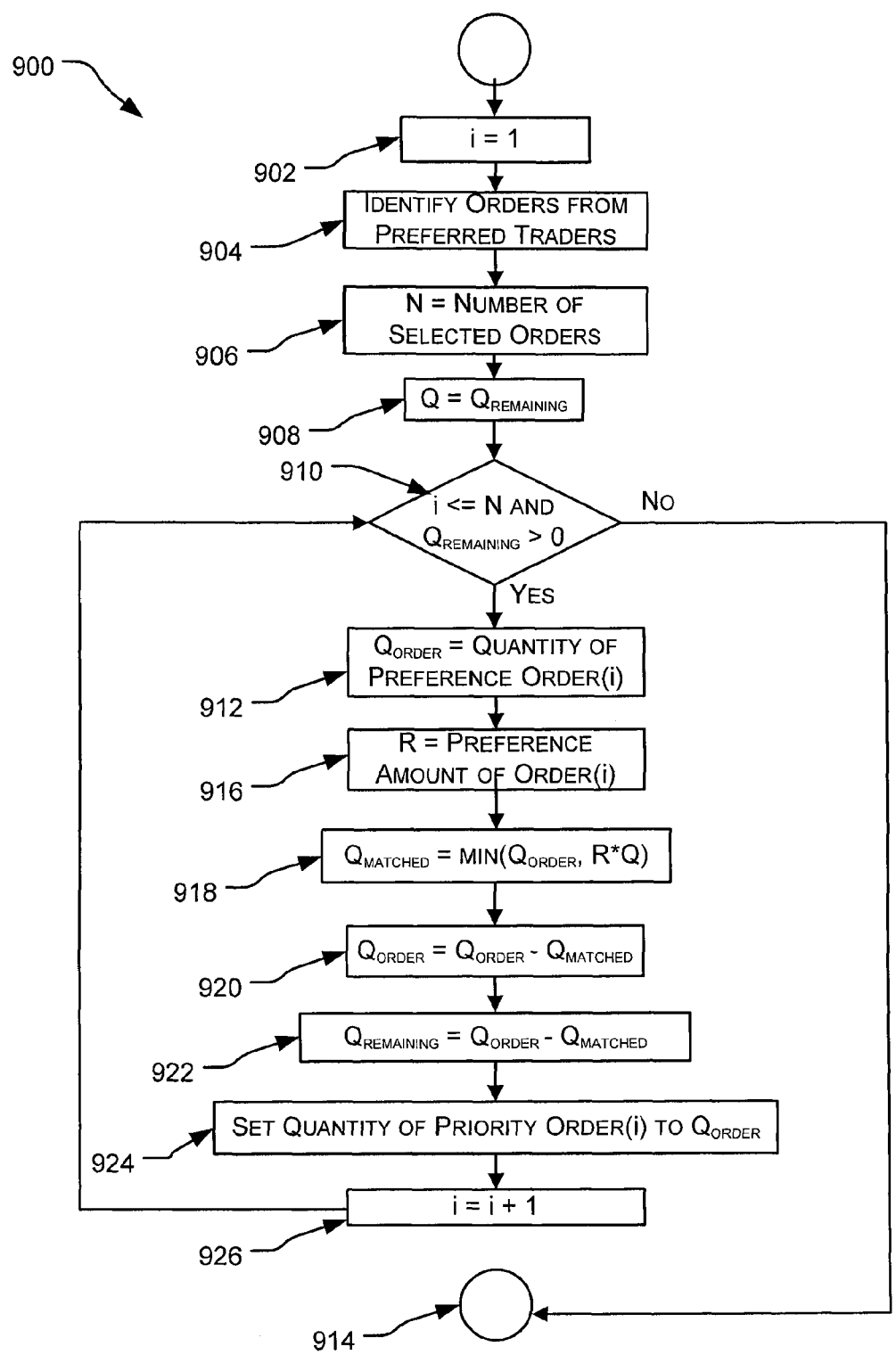
FIG. 9 illustrates an embodiment of allocating a quantity of an incoming order to orders submitted by traders who are given a preference.

FIG. 9 illustrates a preferred trader allocation algorithm 900 that allocates, on the basis of preferences provided to traders, the remaining quantity $Q_{remaining}$ of the incoming order to the orders selected and identified at block 522 (see FIG. 5) and that have an unfilled quantity associated therewith.

At block 902, the preferred trader allocation algorithm 900 sets a counter value i to 1.

At block 904, the preferred trader allocation algorithm 900 identifies orders submitted by traders who are provided with, assigned or otherwise earn and/or acquire a preference and/or a priority status.

At block 906, the preferred trader allocation algorithm 900 sets the value of number of orders N to equal the identified orders at block 904.

At block 908, the preferred trader allocation algorithm 900 sets the value of the quantity variable Q to equal $Q_{remaining}$.

At block 910, the preferred trader allocation algorithm 900 analyzes the order book to determine if orders from one or more preferred traders remain and the quantity of the incoming order remains. If no further orders from preferred traders remain and/or none of the quantity of the incoming order remains then, at block 914, the preferred trader allocation algorithm 900 continues allocating any remaining quantity of the incoming order.

At block 912, the preferred trader allocation algorithm 900 sets a value of the variable $Q_{order}$ to equal the quantity of the $i^{th}$ order identified at block 904.

At block 916, the preferred trader allocation algorithm 900 identifies a value for a variable (R) that represents a predetermined portion of the incoming order to which the preferred trader is entitled and that may vary from trader to trader. In an embodiment, if the preferred trader has submitted multiple orders at the same price, the trading host and/or the preferred trader allocation algorithm 900 insures that the total allocation to the preferred trader does not exceed the predetermined portion by adjusting the value of the variable R accordingly.

At block 918, the preferred trader allocation algorithm 900 determines a value that represents the quantity of the incoming order to be matched to the $i^{th}$ order matched quantity $Q_{matched}$ by calculating the minimum of the quantity of the $i^{th}$ order and the product of the value of the variable R and the value of the variable Q.

At blocks 920 and 922, the value of the matched quantity $Q_{matched}$ may be subtracted from the values $Q_{order}$ and $Q_{remaining}$, respectively.

At block 924, the preferred trader allocation algorithm 900 sets the value of the $i^{th}$ order to equal the value stored by the variable $Q_{order}$ and updates the order database to reflect the match.

At block 926, the preferred trader allocation algorithm 900 increments the value of the counter i and processing may return to the analysis step represented the block 910.

G. Selected Order FIFO Allocation Algorithm

In one embodiment a matching algorithm may be configured to allocate lots to selected orders according to FIFO principles. For example, the matching algorithm may identify a number of orders based on a predefined criterion. Lots may, in turn, be allocated to the identified orders according to FIFO principles up to, for example, a given quantity.

Figure 10:
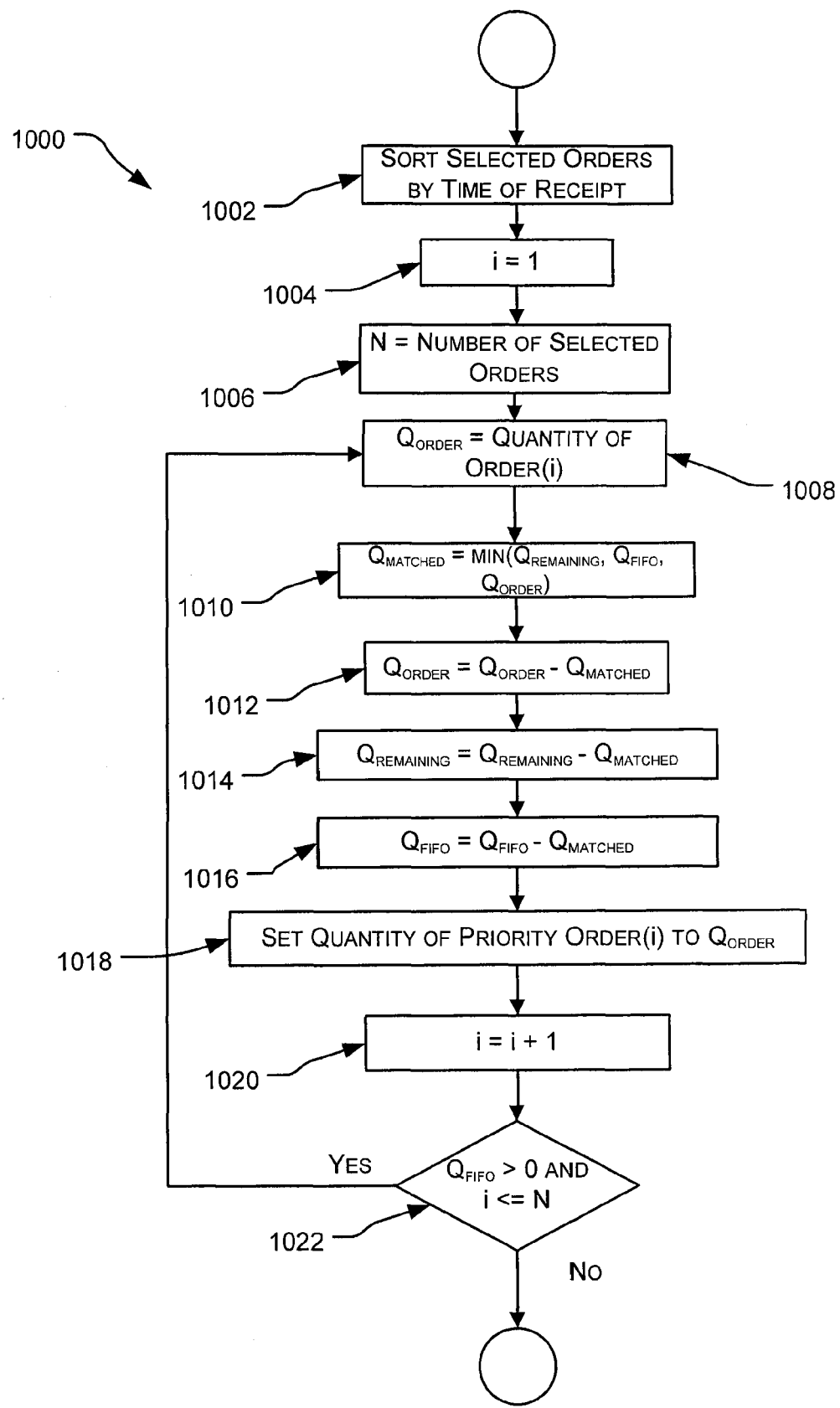
FIG. 10 illustrates an embodiment of how a quantity of an incoming order may be allocated to standing orders using a FIFO algorithm.

FIG. 10 illustrates a selected order FIFO allocation algorithm 1000 that shows how the quantity $Q_{FIFO}$ of the incoming order is allocated to selected orders using the FIFO algorithm.

At block 1002, the FIFO allocation algorithm 1000 sorts the selected orders in accordance with the time each order was received.

At block 1004, a counter variable i may be set or assigned a value equal to one (1).

At block 1006, the FIFO allocation algorithm 1000 may set a value of the number of orders (N) variable to equal the actual, selected number of orders.

At block 1008, the FIFO allocation algorithm 1000 sets a value of the quantity of the product specified $Q_{order}$ variable to equal the actual quantity of the product specified in $i^{th}$ order of the sorted and selected orders.

At block 1010, the quantity of the product specified calculates the quantity of the incoming order to allocate to the $i^{th}$ order using a FIFO algorithm. For example, the FIFO allocation algorithm 1000 sets the matched quantity $Q_{matched}$ to equal the minimum of the quantity of the incoming order that remains to be allocated ($Q_{remaining}$), the quantity of orders that may be allocated using the FIFO algorithm ($Q_{FIFO}$), and the quantity of the $i^{th}$ order ($Q_{order}$).

At blocks 1012, 1014, and 1016, the FIFO allocation algorithm 1000 subtracts the value of matched quantity $Q_{matched}$ from the values of $Q_{order}$, $Q_{remaining}$, and $Q_{FIFO}$ respectively, to reflect the quantity of the incoming orders that is allocated to the $i^{th}$ order.

At block 1018, the quantity that remains of the $i^{th}$ order may be set to $Q_{order}$.

At block 1020, the FIFO allocation algorithm 1000 may increment the value represented by the counter variable i by one (1) thereby allowing the FIFO allocation algorithm 1000 at the block 1008 to select the next order received for allocation.

At block 1022, the FIFO allocation algorithm 1000 may branch or continue to the block 1008 if any quantity of the incoming order remains that can be allocated using the FIFO algorithm ($Q_{FIFO}>0$) and if another selected order need to be considers (i<=N). If these conditions are not satisfied, the FIFO allocation algorithm 1000 returns to the calling block (e.g., the block 616 shown in FIG. 6A).

H. Selected Order Pro-Rata Allocation Algorithm

In one embodiment a matching algorithm may be configured to allocate lots to selected orders according to pro-rata principles. For example, the matching algorithm may identify a number of orders based on a predefined criterion. Lots may, in turn, be allocated to the identified orders according to pro-rata principles up to, for example, a given quantity.

Figure 11A:
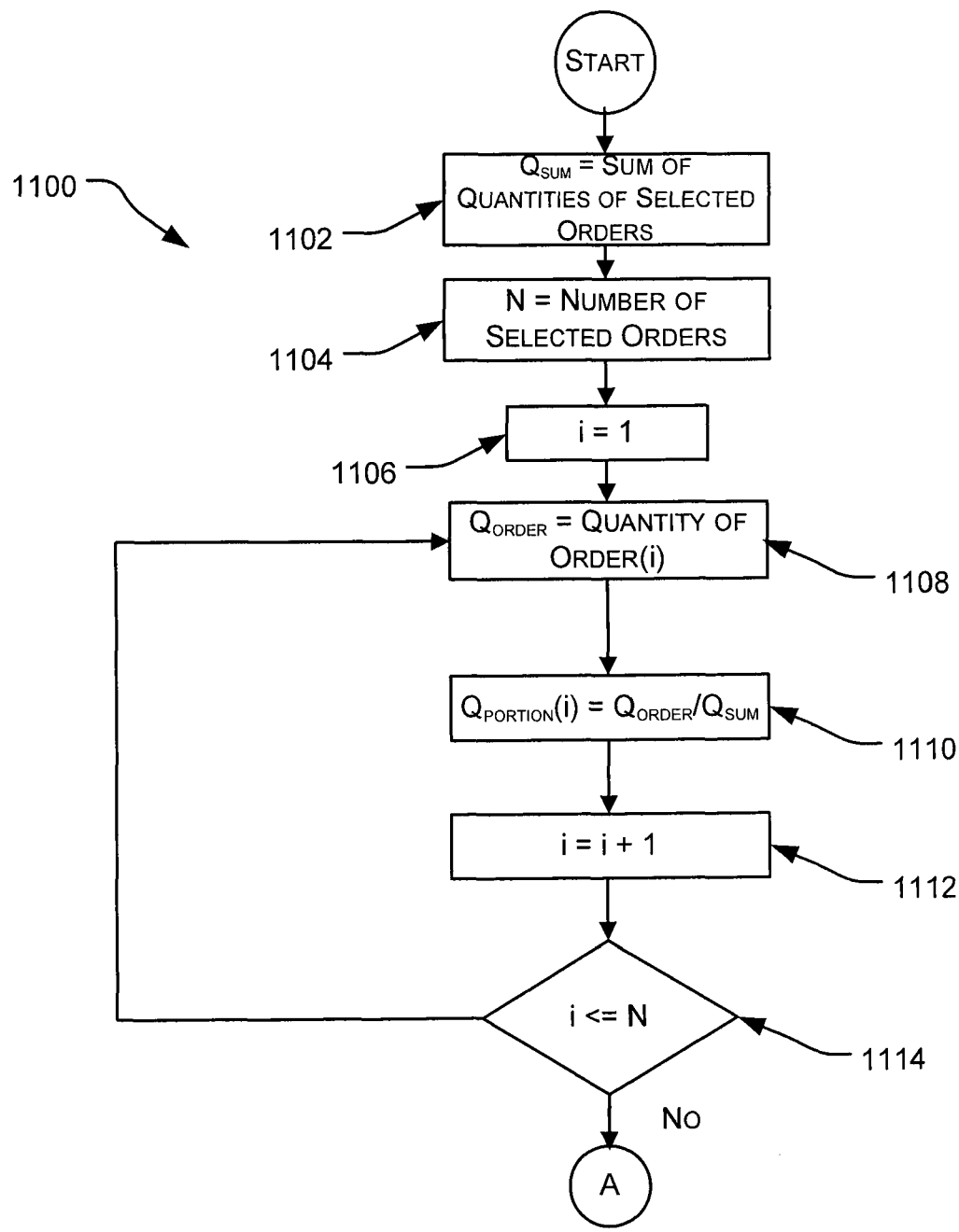
FIGS. 11A to 11C illustrate an embodiment of how a quantity of an incoming order may be allocated to standing orders using a pro-rata algorithm.
Figure 11B:
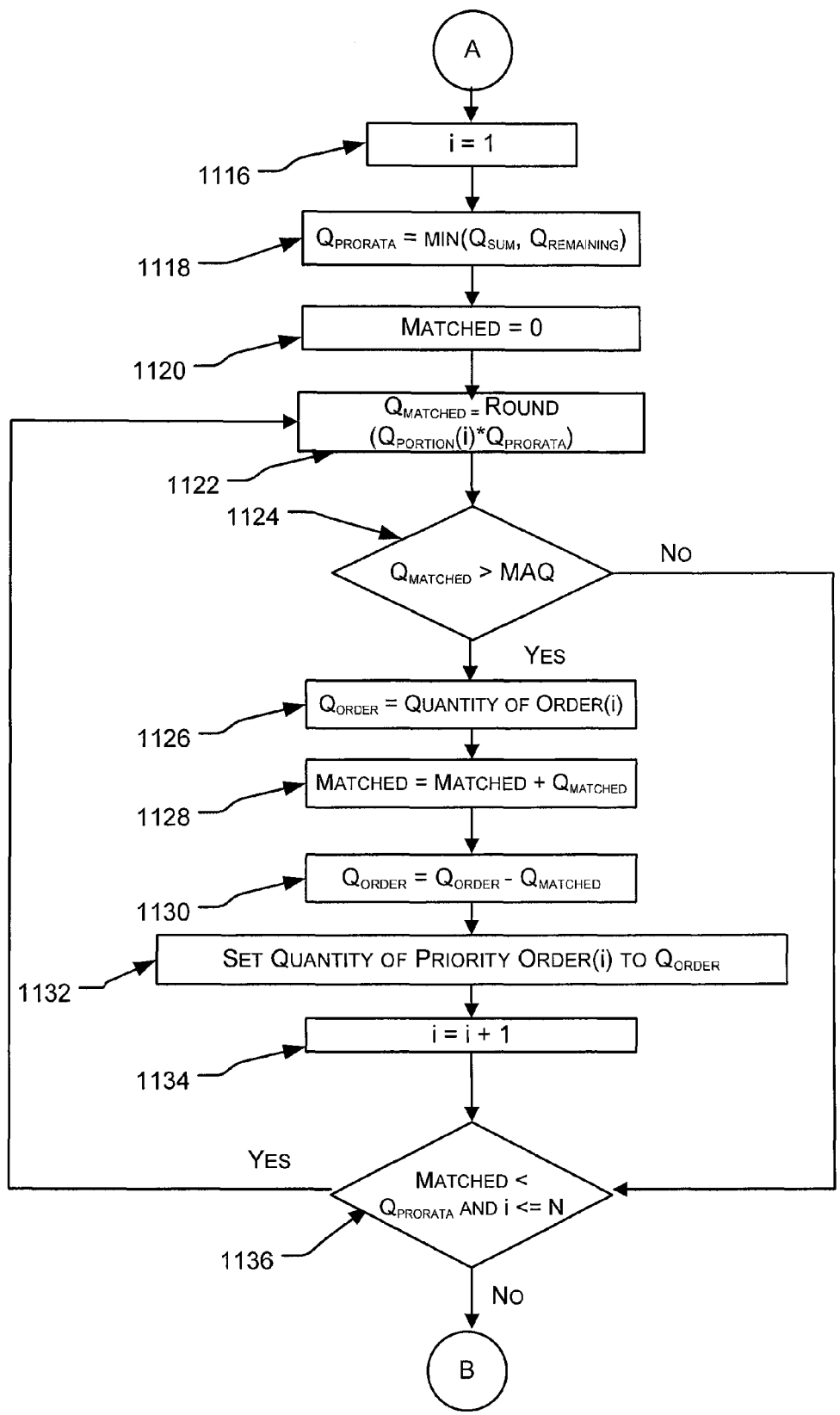
Figure 11C:
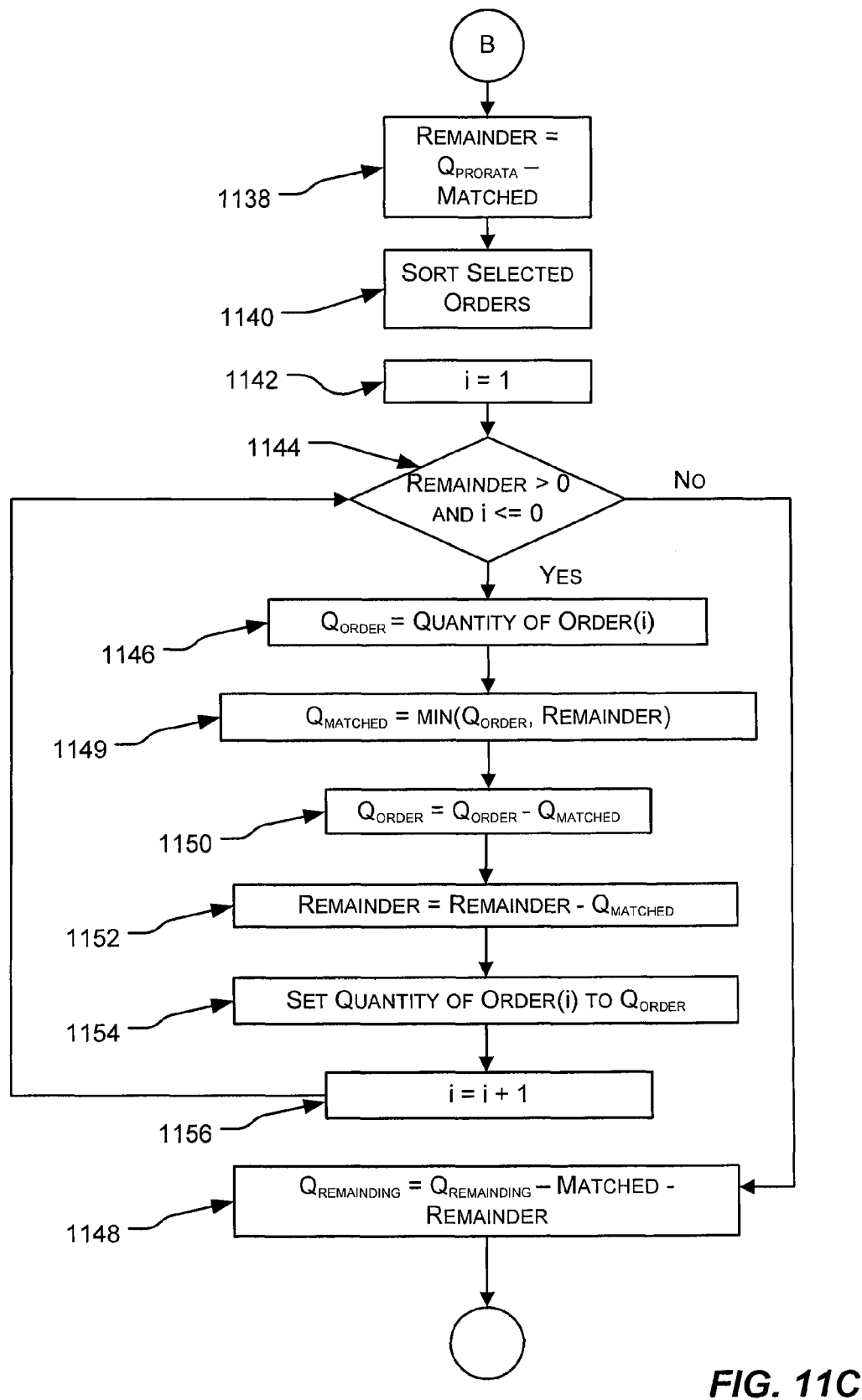

FIGS. 11A to 11C illustrate an exemplary selected order pro-rata allocation algorithm 1100 configured to allocate the remaining quantity $Q_{remaining}$ of an incoming order to one or more selected orders in accordance with the pro-rata algorithm. For example, the selected order pro-rata allocation algorithm 1100 may represent, compliment and/or replace the processing executed at blocks 614, 616 and/or 620 shown in FIG. 6A.

At block 1102, a sum of the quantities of selected orders $Q_{sum}$ may be calculated based on an actual/determined sum of the quantities of the selected orders.

At block 1104, the number of selected orders N may be determined and assigned.

At block 1106 a counter variable i is set or assigned a value equal to one (1).

At block 1108, the selected order pro-rata allocation algorithm 1100 may determine the quantity of the $i^{th}$ selected order.

At block 1110, the selected order pro-rata allocation algorithm 1100 may calculate a proportion that the quantity of the $i^{th}$ selected order comprises of the total of the quantities of the selected order $Q_{portion}$.

At block 1112, the counter variable i may increment or increase the counter value by one (1).

A block 1114, the selected order pro-rata allocation algorithm 1100 may compare the counter variable i to the number of selected orders N and, if the value of counter variable i is less than the value of the selected orders N continues, branches or returns to the block 1108. However, if the value of the counter variable i is greater than the value of the selected orders N, the selected order pro-rata allocation algorithm 1100 may proceed to the block 1116 (see FIG. 11B) where the value of the counter variable i is reset to equal one (1).

FIG. 11B, which continues on from FIG. 11A, depicts that the selected order pro-rata allocation algorithm 1100, at block 1118, calculates a value for the pro-rata quantity $Q_{prorata}$ that is the minimum of the total of the quantities of the selected orders $Q_{sum}$ and the remaining quantity $Q_{remaining}$.

At block 1120, the selected order pro-rata allocation algorithm 1100 sets the value of the variable matched to equal zero (0).

At block 1122, the value of a matched quantity $Q_{matched}$ which equals the quantity of the incoming order to be allocated to the $i^{th}$ selected order may be calculated by multiplying the proportion of the i selected order ($Q_{portion}[i]$) and the value of the pro-rata quantity $Q_{prorata}$. In an embodiment, the product of $Q_{portion}[i]$ and $Q_{prorata}$ may be rounded down to the nearest integer by truncating any fraction portion thereof. In another embodiment, the product may be rounded up to the next higher integer if the fractional portion of the product is greater than 0.5 and down to the preceding lower integer otherwise. Other rounding schemes that may be used are known to those skilled in the art.

At block 1124, the value of the matched quantity $Q_{matched}$ may be compared to a value of the minimum allocation quantity (MAQ) that is defined for the market. For example, the value of the MAQ may be defined in the specification for the market. If the matched quantity $Q_{matched}$ is greater than the value of the MAQ then at block 1126, the selected order pro-rata allocation algorithm 1100 may set $Q_{order}$ to equal the quantity associated with the $i^{th}$ order. Alternatively, if the value $Q_{matched}$ is less than the value of the MAQ, then the selected order pro-rata allocation algorithm 1100 may proceed to block 1136.

At block 1128, the selected order pro-rata allocation algorithm 1100 adds the value of $Q_{matched}$ to the value of the variable matched which was initialized at block 1120.

At block 1130, the value of the variable $Q_{matched}$ may be subtracted from the value of the variable $Q_{order}$.

At block 1132, the selected order pro-rata allocation algorithm 1100 may set the quantity of the $i^{th}$ order to equal the value of the variable $Q_{order}$.

At block 1134, the counter variable i may increment or increase the counter value by one (1).

At block 1136, the selected order pro-rata allocation algorithm 1100 may determine or evaluate if the value of the variable matched is less than the value of the variable $Q_{prorata}$, and if the value of the counter variable i is less than or equal to the number of selected orders (N). If both comparisons are determined to be true, then the selected order pro-rata allocation algorithm 1100 proceeds to block 1122 to continue allocating the incoming order to the remaining selected orders. If one or both of the comparisons false (or un-true), then the selected order pro-rata allocation algorithm 1100 may proceed to block 1138 (see FIG. 11C) to allocate any quantity of the incoming order that was not allocated.

FIG. 11C, which continues on from FIG. 11B, depicts that the selected order pro-rata allocation algorithm 1100, at block 1138 may calculate a value of the variable remainder that is the difference between the quantity that could have been allocated using the prorata algorithm ($Q_{prorata}$) and the quantity that actually was allocated process steps or procedures represented by the blocks 1122 to 1136 (represented by the variable matched). The value of the variable remainder represents the quantities not allocated because of rounding or because a value $Q_{matched}$ was less than the value of the minimum allocation quantity.

At block 1140, the selected order pro-rata allocation algorithm 1100 may sort the selected orders. In an embodiment, the selected orders may be sorted in accordance with the time when each order was received. In another embodiment, the selected orders may be sorted in accordance with the portion of the sum of the quantities of all of the selected orders represented by the quantity of each selected order.

At block 1142, the counter variable i may be reset to a value of one (1).

At block 1144, the selected order pro-rata allocation algorithm 1100 may evaluate if any quantity of the variable remainder needs to be allocated (i.e., that the value remainder is greater than 0), and if all of the selected orders have been considered (i.e., that value of the counter i is less than or equal to the value N). If both evaluations are true, the selected order pro-rata allocation algorithm 1100 may proceed to block 1146. However, if one or more are false (or un-true), then the selected order pro-rata allocation algorithm 1100 may proceed to block 1148. At block 1148, the selected order pro-rata allocation algorithm 1100 may calculate the remaining quantity $Q_{remaining}$ of the incoming order after the allocation process discussed in connection with the blocks 1102 to 1156. For example, the value of the variable $Q_{remaining}$ which represents the remaining quantity, may be decreased by the value of the variable matched and the value of the variable remainder. Thereafter, process may resume with the selected order pro-rata allocation algorithm 1100 returning to point at which the pro-rata allocation algorithm was initiated, e.g., the block 620.

At block 1146, the value of the variable $Q_{order}$ may be set to equal to any remaining quantity of the $i^{th}$ order (as sorted by the block 1140).

At block 1149, the value of the variable $Q_{matched}$ may be calculated or determined based on the minimum of the value of the variable $Q_{order}$ and value of the variable remainder.

At block 1150, the value of the variable $Q_{matched}$ may be subtracted from the value of the variable $Q_{order}$ and the result, in turn, may be set as the value of $Q_{order}$.

At block 1152, the selected order pro-rata allocation algorithm 1100 may set the value of the variable remainder to equal the result of subtracting the value $Q_{matched}$ from the current value of the variable remainder.

A block 1154 set the quantity associated with $i^{th}$ order to the value $Q_{order}$.

At block 1156, the counter variable i may increment or increase the counter value by one (1) and the selected order pro-rata allocation algorithm 1100 may proceed to block 1144.

II. Multiple Order Priority

A. Priority for Orders that Improve a Market

In one embodiment a matching algorithm may be configured to designate a predefined number of orders as priority orders if the orders are determined to improve the market and/or satisfy a minimum order quantity.

Some embodiments allow more than one order to have priority. FIG. 12A shows a table 1200 of exemplary standing orders in a market. For this example, the first three (3) orders that improve the market and that request an order quantity of at least twenty (20) lots are given priority. In addition, the maximum quantity of an incoming order that is allocated to each order based on the priority is fifty (50).

Column 1202 indicates the time of receipt of each order. Columns 1204 and 1206 show the price and quantity requested by each order listed in column 1202, respectively. As shown in the column 1204, each of the orders has an identical price and this example assumes this is the best price for the market.

Column 1208 shows a quantity of each order filled based on priority. Although the earliest received order is order A, no portion of order A may be filled based on priority because this order does not meet the minimum quantity criterion of twenty (20) lots. Orders B to D are given priority because these are the first three orders to improve the market and that meet the minimum quantity criterion. Furthermore, up to fifty (50) lots of the orders C and D may be allocated based on priority.

B. Priority as a Function of Min/Max Quantity

In one embodiment a matching algorithm may be configured to designate a predefined number of orders as priority orders if the orders are determined to improve the size and/or volume of the market.

FIG. 12B shows a table 1210 that depicts how an exemplary market may provide priority to standing orders that improve the market based on a predefined quantity. For example, an order that includes a quantity of one hundred and twenty (120) lots may be distributed or allocated to one or more standing bid orders (orders A to E) if the standing orders satisfy a minimum quantity requirement of twenty (20) lots, then they are prioritized and may receive up to a maximum of fifty (50) lots per order.

Column 1211 identifies when each order A to E was received. Column 1212 shows the price associated with each of the orders A to E. Column 1214 shows the quantity requested by each of the orders A to E. Column 1216 shows the distribution and/or allocation of the 120 lots to the prioritized orders A to E. Specifically, order A does not receive any priority because order A does not meet the minimum requirement. Thirty (30) lots of order B may be allocated on the basis of priority. A maximum quantity of fifty (50), out of the ninety-five (95) lots requested by order C, may be allocated on the basis of priority because fifty (50) is the maximum. All of the thirty (30) lots requested by order D may be allocated on a priority basis. Of the fifty (50) lots requested by order E, only ten (10) lots may be allocated based on priority because the quantity available for priority is exhausted. Note, if the trading host receives a second or subsequent matching incoming (sell) order having a quantity of at least one-hundred (100) lots, the trading host may allocate forty-five (45) lots of the incoming order to order C, forty (40) lots to order E, and then the remaining fifteen (15) lots to order A.

C. Retention of Priority for Orders that Improve a Market

In one embodiment a matching algorithm may be configured to designate an order as a priority order if the order is determined to improve the market, and the priority is maintained even if another order is received and is designated a priority order.

Some embodiments may allow orders that are designated as priority orders for improving the market, may retain the designated priority even if the market is further improved by subsequent orders. FIG. 13A shows a table 1300 of representative standing orders A to D to sell a product in a market. In this example, as many as three (3) orders that improve the market may be designated as priority orders and each priority order may be allocated the maximum quantity of fifty (50) lots, if the identified orders are for at least the minimum quantity of twenty (20) lots.

Column 1302 shows the time of receipt of each order. Columns 1304 and 1306 show the price and quantities of each order, respectively. In this example, the price of each of the orders A to D is identical. Column 1306 shows the quantity of each of the orders A to D that is eligible to be allocated based on priority. In particular, column 1308 shows orders B to D are designated as priority orders while order A does not satisfy the minimum quantity requirement and is therefore not designated a priority order. Thus, orders B to D may be allocated up to the maximum quantity of fifty (50) lots assuming that the initial contra order(s) includes a sufficient quantity for this allocation.

FIG. 13B relates to table 1300 shown in FIG. 13A. In particular, FIG. 13B illustrates a table 1310 that expands on the table 1300 and includes an order E that improves the market price. Order E may be designated as a priority order because it improves the market price and satisfies the minimum quantity requirements. Orders B and C retain the priority previously provided because the market in this example may have as many as three (3) standing orders that have priority. For the same reason, the priority provided to order D before the receipt of order E may be revoked. In some markets, a predetermined number of orders at the same price are given priority. In other markets, a predetermined number of orders at different price levels are given priority.

Column 1312 shows the quantities of the orders B, C, and E that may be filled based on priority. While the orders B and C may retain their designated priority, the trading host may first fill standing orders at a better price before filling the orders B and C even if such standing orders do not have priority.

D. Aging of Order Priority

In one embodiment a matching algorithm may be configured to designate an order as a priority order if the orders are determined to improve the market, and the priority is maintained and associated with the resting order for a predetermined period of time before expiring.

In an embodiment, orders may be designated priority orders for a period of time or a specific duration or until the occurrence of a predefined event such as, for example, the close of the market. After expiration of the period of time, the designated priority may be revoked. In another embodiment, priority designations for all orders may be revoked after a period of time or duration. For example, the period of time may begin when an initial (first) order is designated as a priority order. The period of time may be fixed for the market (e.g., 30 seconds, 10 milliseconds) or may be dynamic and adjusted in accordance with market activity. Alternatively or in addition to, the period of time may vary by market and in some markets the period of time may be a sub-second interval.

FIGS. 14A and 14B illustrate the aging of order priorities. Specifically, FIG. 14A shows a table 1400 of standing orders A to D in a market at a time 10:00:04, wherein orders A to C, the first three (3) orders, were received at 10:00:01, 10:00:02, and 10:00:03, respectively. Orders A to C have been designated priority orders and allocated lots accordingly (as shown in column 1402). The examples illustrated in FIGS. 14A and 14B require no minimum quantity to receive priority or cap the maximum quantity of the lots within an order that may be filled in accordance with the designated priority. FIG. 14B shows a table 1404 that illustrates the status of the standing orders A to D at a time 10:01:04. Column 1406 illustrates an embodiment in which the priority designation associated with the orders A to C are revoked after a period of time, in this case after one (1) minute.

E. Priority Including FIFO/Pro-Rata and Min/Max Quantity

In one embodiment a matching algorithm may be configured to designate an order as a priority order if the order is determined to improve the market and/or satisfy a minimum order quantity. The priority order may have lots allocated to it according to FIFO principle up to a maximum quantity.

FIG. 15 illustrates a table 1500 that represent a plurality of standing orders A to G in an exemplary market. For example, it may be assumed that (1) the orders A to G are sorted by the time each order was received; (2) order A was received first, and (3) order A improved the market. Furthermore, it may be assumed that the market (1) utilizes a value of $FIFO_{percent}$ of thirty percent (30%); (2) designates two (2) market improving orders as priority orders; (3) requires a minimum order quantity of twenty (20) lots; and (4) limits or caps the quantity of an order that may be allocated on the basis of the priority to fifty (50) lots. The market may further round down allocations based on the use of a pro-rata algorithm. The market illustrated by table 1500 may provide a preference to the traders who submitted orders C and E. In particular, order C may be entitled to an allocation of up to ten-percent (10%) of a quantity of the incoming order that remains after priority allocation. Similarly, order E may be entitled to receive up to five-percent (5%) of the quantity of the incoming order that remains after allocation of the incoming order to any orders that have priority.

For example, turning to the table 1500 shown in FIG. 15, it may be assumed that the trading host receives an order to sell five hundred (500) lots at 111.01, and that the orders A to G are orders, within the same market, to buy five hundred and seventy-eight (578). It may be further assumed that each of orders A to G has an identical bid price that is better than or equal to 111.01.

Column 1502 indicates that orders A and B are designated priority orders and are allocated fifty (50) and thirty (30) lots, respectively, of the incoming order. Order A requests eighty (80) lots, however the market caps priority allocations to fifty (50).

The quantity of the incoming order that remains after the priority allocation is four hundred and twenty (420) lots. Therefore, orders C and E are allocated forty-two (42) lots and twenty-one (21) lots, respectively, because of the provided ten-percent (10%) and five-percent (5%) allocations (see column 1504).

The quantity of the original incoming order remaining after the preference allocation is three hundred and fifty-seven (357) lots. Of the three hundred and fifty-seven (357) lots, the $FIFO_{percent}$ of thirty percent (30%) or one-hundred and seven lots (107) may be allocated utilizing a FIFO algorithm. In this example, the $FIFO_{percent}$ of lots to be allocated is rounded down. It will be understood that the $FIFO_{percent}$ of lots to be allocated may be rounded up (to one-hundred and eight lots (108) in this example).

Column 1506 shows the allocation to each order A, C and D (order B was completely filed via the priority allocation). Column 1508 shows that three hundred and twenty-eight (328) lots remain to be filled. The quantity of the incoming that remains to be allocated is two hundred and fifty (250) lots. Column 1510 shows the allocation of three hundred and twenty-eight (328) lots represented by the quantity allocated to each order D to G. Column 1512 shows the allocation of the remaining two hundred and fifty (250) lots in accordance with the pro-rata proportion. Because the pro-rata algorithm used by this market rounds down fractional allocation quantities, 2 lots remain to be allocated and these are allocated on a FIFO basis to order D as shown in a column 1514.

Although the embodiments and examples described above illustrate the use of a $FIFO_{percent}$ value to determine the number of contracts that are allocated using the FIFO algorithm, it should be apparent that a $ProRata_{percent}$ value may be used instead to determine the number of contracts that are allocated using the pro-rata algorithm. Furthermore, an incoming order may be allocated in accordance with the pro-rata algorithm first and then any quantity that remains thereafter may be allocated using the FIFO algorithm. In addition the incoming order may be allocated to standing contra orders using a combination of FIFO, pro-rata, multiple priority and multiple preferencing algorithms. Such algorithms may be combined with other allocation and order selection algorithms that may be apparent to those with skill in the art.

III. Inner/Outer Market Allocation

In one embodiment a matching algorithm may be configured to identify an inner market and an outer market. Incoming orders within a market parameter, e.g., five (5) ticks, are identified as inner market orders and have lots allocated to them based on FIFO principles. All remaining orders are identified as outer market orders and have lots allocated to them based on pro-rata principles.

Figure 16A:
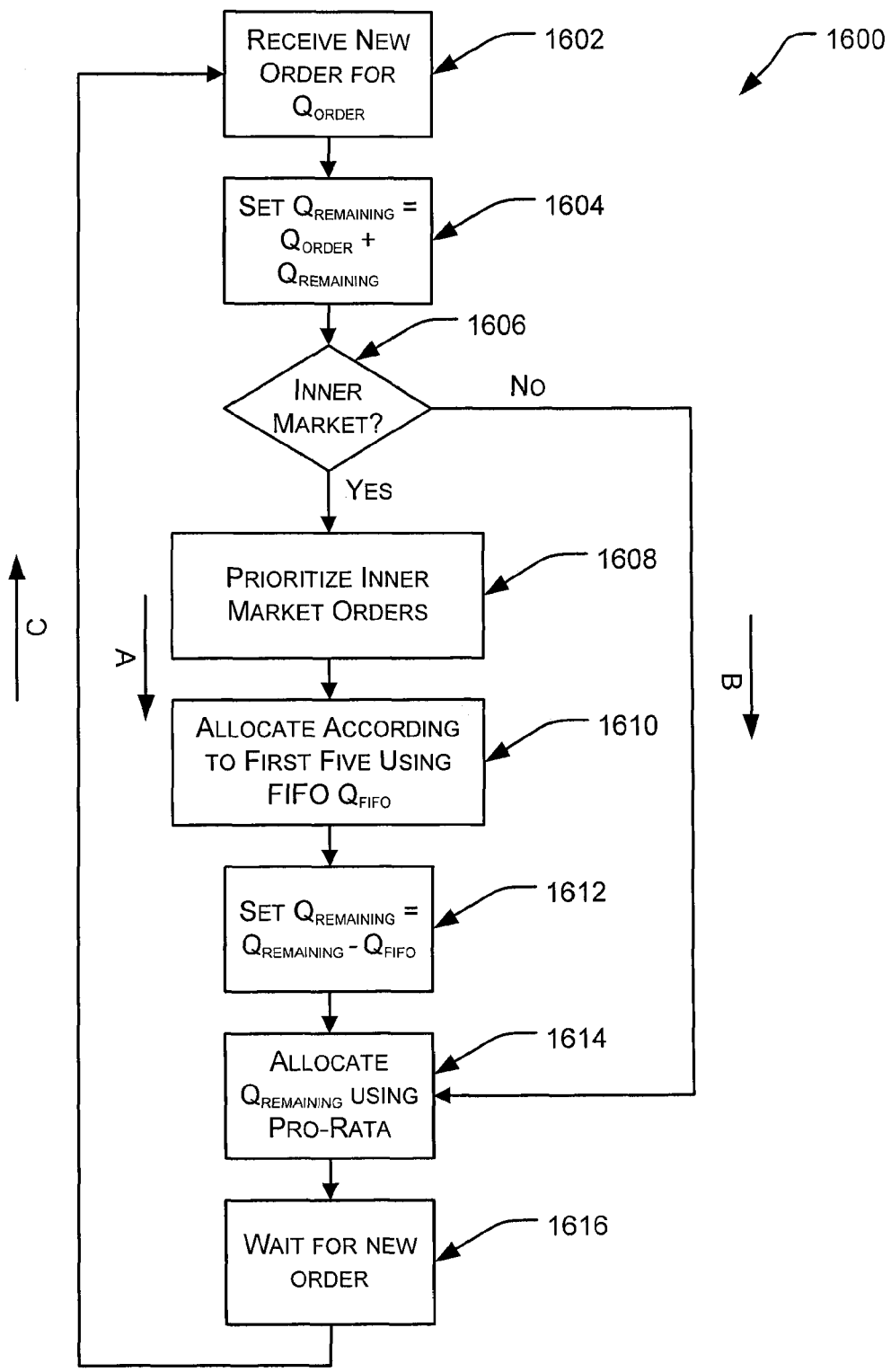
FIG. 16A illustrates an example of allocation of an incoming order according to an inner/outer market allocation algorithm.

FIG. 16A Illustrates an inner/outer market allocation algorithm 1600, the teaching and disclosure of which may be implemented at or in conjunction with the block 524 (see FIG. 5) of the FIFO matching algorithm 500. The inner/outer market allocation algorithm 1600 details another matching or allocation scheme for segmenting orders and distributing or allocating contra orders represented by the value of $Q_{remaining}$ according an inner market parameter $IM_{parameter}$. For example, in one embodiment, the inner/outer market allocation algorithm 1600 may include an $IM_{parameter}$ set to equal five (5) ticks. In particular, the inner/outer market allocation algorithm 1600 identifies orders, within a predefined range e.g., within five (5) ticks between the contra bids and orders.

The identified orders, in turn, may be designated as priority orders which represent an inner market. All other, undesignated orders may represent the outer market. The inner market parameter $IM_{parameter}$ may be adjusted or defined based, for example, on market volatility. In a volatile market, $IM_{parameter}$ may be a large value to account large changes in the market. Conversely, in a stable or more stable market, $IM_{parameter}$ may be a smaller value because the changes may be less severe. Alternatively, $IM_{parameter}$ may be adjusted throughout a period of time, for example, a trading session, in response to the volume of the market.

In another embodiment, the inner market parameter $IM_{parameter}$ may be the two (2) orders with the highest bid or value resting within the order book. In this example, the orders corresponding with the two highest bids may be designated as priority orders. As the highest bid changes over time, the two (2) orders allowed by $IM_{parameter}$ may change and vary. Regardless of the value or variable represented by the inner market parameter $IM_{parameter}$, the inner/outer market allocation algorithm 1600 may be configured to allocate lots to inner market orders according to FIFO principles, while allocating lots to the remaining or outer market orders according to pro-rata principle.

Returning to FIG. 16A, the disclosed inner/outer market allocation algorithm 1600 is assumed to be operable in connection with an existing market and order book such as, for example, the market discussed in connection with blocks 502 to 516 shown in FIG. 5. At block 1602, the inner/outer market allocation algorithm 1600 may receive a new order which in this present embodiment may be an offer to sell a plurality of lots $Q_{order}$.

At block 1604, the quantity of lots remaining to be filled or allocated $Q_{remaining}$ may be set to include or equal the plurality of lots $Q_{order}$ plus any residual lots associated with $Q_{remaining}$. The quantity $Q_{remaining}$ may include any quantity of lots remaining from previous implementations of the inner/outer market allocation algorithm 1600.

At block 1606, the price associated with $Q_{order}$ may be evaluated against the inner market parameter $IM_{parameter}$ that may be, for example, two (2) ticks between the bid and offer spread of contra orders. If the price associated with $Q_{order}$ is within the range defining the inner market, then the inner/outer market allocation algorithm 1600 may proceed along the path indicated by the arrow A. Alternatively, if the price associated with $Q_{order}$ is outside the range defining the inner market, then the inner/outer market allocation algorithm 1600 may proceed along the path indicated by the arrow B.

At block 1608, a predetermined number of incoming orders may be identified and designated priority orders based on the price associated therewith. In particular and for example, the first five orders that fall within two (2) ticks of the bid/order spread.

At block 1610, the quantity of lots remaining to be filled or allocated $Q_{remaining}$ may be allocated to the designated priority orders utilizing FIFO principles. The number of lots allocated to all of the designated priority orders, i.e. all of the inner market orders, may be identified as $Q_{FIFO}$.

At block 1612, the quantity of lots remaining to be filled or allocated $Q_{remaining}$ may be updated by subtracting the number of lots allocated utilizing FIFO principles $Q_{FIFO}$ from the original quantity of lots remaining to be filled or allocated $Q_{remaining}$ set at block 1604.

At block 1614, received orders having a price associated with $Q_{order}$ that is outside the range defining the inner market less than or equal to the current high market price (as determined at block 1606) and/or the quantity of lots remaining to be filled or allocated $Q_{remaining}$, may be allocated to the remaining orders within the order book according to pro-rata principles.

At block 1616, the inner/outer market allocation algorithm 1600 may wait for new incoming orders and proceed along the path indicated by the arrow C to the block 1602 upon receipt of a new order.

FIGS. 16B and 16C show tables 1640/1640' and 1680/1680', respectively. In particular, the tables 1640 and 1680 illustrates multiple offers and bids corresponding to the orders A to H in a market organized and operable according to the inner/outer market allocation algorithm 1600 discussed above.

FIG. 16B shows the tables 1640 and 1640' which, in turn, depict the allocation of lots to contra orders A to H according to the inner/outer market allocation algorithm 1600. In particular, columns 1642 and 1644 of table 1640 show time and prices associated with each of the orders A to H. Columns 1646 and 1648 show the contra bids and offers at a time interval one (1), the corresponding time intervals are indicated by the column heading "QTY @ Time 1". Similarly, columns 1650 and 1652 of table 1640' show the contra bids and offers at a time interval two (2), the corresponding time intervals are indicated by the column heading "QTY @ Time 2".

The bids, at time interval 1, associated with orders D and E may be designated priority orders because at prices 111.05 and 111.04, respectively, they are within two (2) ticks of the nearest offer, i.e., they are within two (2) ticks of bid/offer spread. As new orders are received, the designated priority orders D and E may be filled or otherwise allocated lots according to FIFO principles. The remaining unallocated quantity $Q_{remaining}$ from the example above, may be allocated according to pro-rata principles.

The bids, at time interval 2, associated with orders F and G may designated priority orders because at prices 111.03 and 111.02, respectively, they are within two (2) ticks of the nearest offer, i.e., they are within two (2) ticks of bid/offer spread. As new orders are received, the designated priority orders F and G may be filled or otherwise allocated lots according to FIFO principles. The remaining unallocated quantity $Q_{remaining}$ from the example above may be allocated according to pro-rata principles.

It will be understood that many variations and alterations may be implemented to further refine the allocation of lots according to the inner/outer market allocation algorithm 1600. For example, the priority designation may or may not be a time-sensitive priority designation. If, for example, the priority designation associated with orders D and E were not a time-sensitive priority designation, these orders will retain priority over, and be allocated lots before, the priority designation associated with orders F and G. Thus, in operation, the priority orders D and E may be receive a priority allocation according to FIFO principles and orders F to H may receive an allocation according to pro-rata principles. The priority orders D and E may retain this priority until they have been filled or otherwise received their maximum allocation, and then the priority orders F and H may begin to receive their priority allocation until they have been filled or otherwise received their maximum allocation. In another variation, the FIFO principles utilized to allocate lots to priority orders may include, for example, $FIFO_{percentage}$ to limit or otherwise govern the maximum volume or quantity allocated.

If, for example, the priority designation associated with orders D and E were a time-sensitive priority designation, these orders will retain priority over, and be allocated lots before, for a given period and then may lose their priority designation to the orders F and G. At this point, and $Q_{remaining}$ associated with orders D and E may be, unless re-designated priority at a later time period, be allocated according to pro-rata principles. In yet another variation, a minimum order volume or limit $Q_{min}$ may be established at, for example, five (5) lots. In this example, the order D may no longer be eligible for FIFO allocation and may, instead, be allocated according to pro-rata principles.

FIG. 16C shows the tables 1680 and 1680' which, in turn, depict the allocation of lots to contra orders A to H according to the inner/outer market allocation algorithm 1600. In particular, columns 1642 and 1644 show time and prices associated with each of the orders A to H. Columns 1682 and 1684 of table 1680 show the contra bids and offers at a time interval one (1), the corresponding time intervals are indicated by the column heading "QTY @ Time 1". Similarly, columns 1686 and 1688 of table 1680' show the contra bids and offers at a time interval two (2), the corresponding time intervals are indicated by the column heading "QTY @ Time 2".

The bids, at time interval 1, associated with orders D and F may designated priority orders because at prices 111.05 and 111.03, respectively, they represent the best or highest, i.e, the orders representing the greatest risk, standing bids within the order book. As new orders are received, the designated priority orders D and E may be filled or otherwise allocated lots according to FIFO principles. The remaining unallocated quantity $Q_{remaining}$ from the example above, may be allocated according to pro-rata principles.

The bids, at time interval 2, associated with orders E and F may be designated priority orders because at prices 111.04 and 111.03, respectively, they now represent the best or highest standing bids within the order book. As new orders are received, the designated priority orders E and F may be filled or otherwise allocated lots according to FIFO principles. The remaining unallocated quantity $Q_{remaining}$ from the example above may be allocated according to pro-rata principles.

IV. Priority Pro-Rata with Multiple Order Priority

In one embodiment a matching algorithm may be configured to designate a predefined number of orders as priority orders and lots may be allocated to these priority orders according to pro-rata principles.

Figure 17:
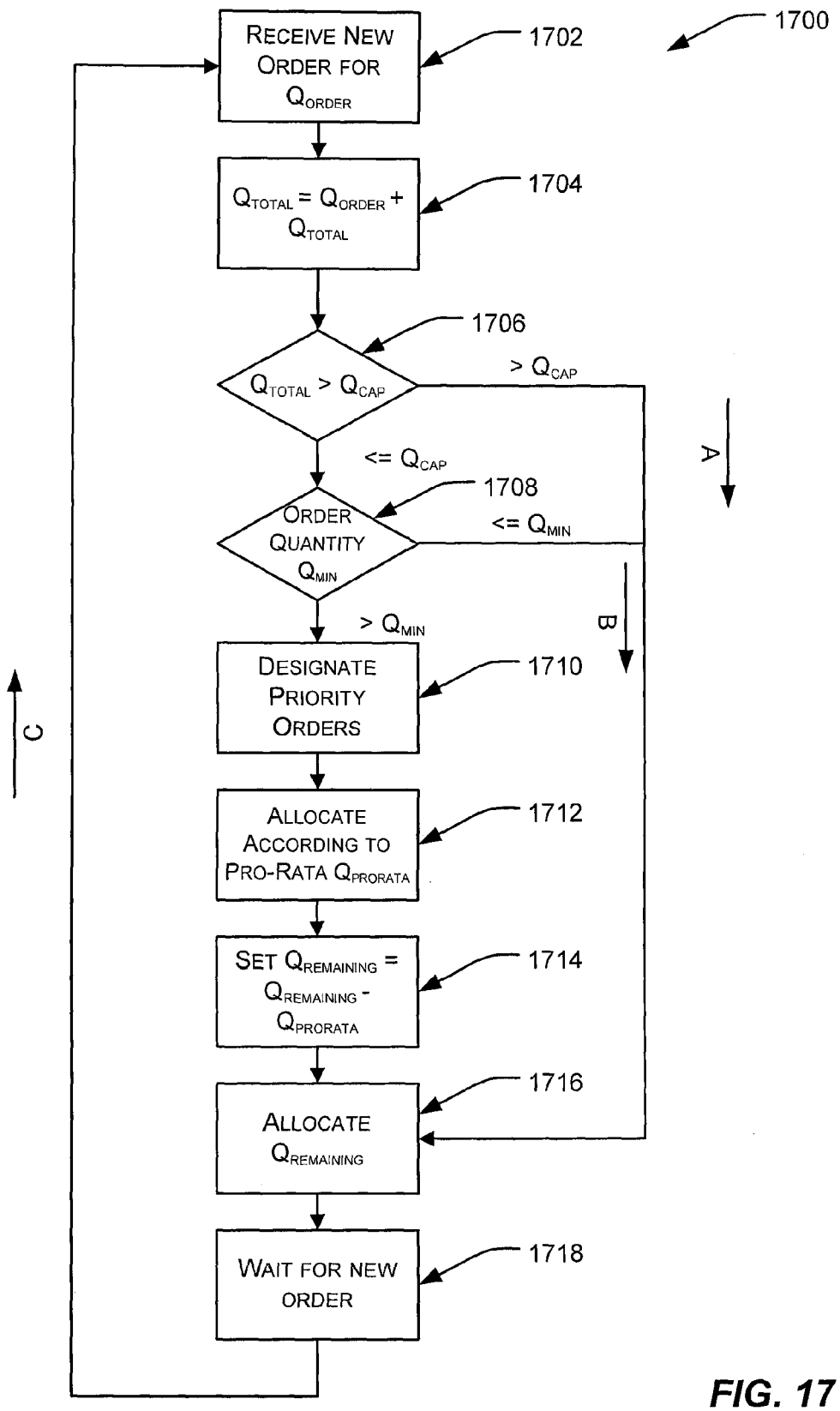
FIG. 17 illustrates an example of allocation of an incoming order according to a priority pro-rata with multiple order priority algorithm.

FIG. 17 Illustrates a priority pro-rata allocation algorithm 1700, the teaching and disclosure of which may be implemented at or in conjunction with the block 524 (see FIG. 5) of the FIFO matching algorithm 500. The priority pro-rata allocation algorithm 1700 details another matching or allocation scheme for allocating or distributing $Q_{remaining}$ according to maximum volume cap. For example, in one embodiment, the priority pro-rata allocation algorithm 1700 may designate the first one-thousand (1000) lots or contracts as priority lots or contracts. The priority lots or contracts may, in turn, be allocated according to pro-rata principles. In an embodiment, if the quantity of an order that includes one or more of the priority contracts is reduced during the pro-rata allocation process, the order and/or the lots may retain priority. In another embodiment, the first one-thousand (1000) lots or contracts designated as priority lots or contracts may be determined based on the initial volume or initial number of lots or contracts, as opposed to a volume that could include subsequent new orders.

Returning to FIG. 17, the disclosed priority pro-rata allocation algorithm 1700 is assumed to be operable in connection with an existing market and order book such as, for example, the market discussed in connection with blocks 502 to 516 shown in FIG. 5. At block 1702, the priority pro-rata allocation algorithm 1700 may receive a new order which in this present embodiment may be an offer to sell a plurality of lots $Q_{order}$.

At block 1704, the total number of lots or contracts $Q_{total}$ pending within an order book for a given market may be updated. For example, the plurality of lots $Q_{order}$ may be added to the current total number of lots or contracts $Q_{total}$ to determine a new value for $Q_{total}$. The value of $Q_{total}$ represents the total number of lots, regardless of the associated orders, that satisfy a given criterion such as price, time, etc.

At block 1706, the priority pro-rata allocation algorithm 1700 may evaluate the total number of lots or contracts $Q_{total}$ with respect to a maximum volume or quantity cap or limit $Q_{cap}$. For example, $Q_{cap}$ may be defined to equal one-thousand (1000) lots or contracts. Thus, if $Q_{total}$ is greater than $Q_{cap}$, that is, if total number of lots or contracts in an order book exceeds one-thousand, then the priority pro-rata allocation algorithm 1700 may proceed along the path indicated by the arrow A to the block 1716. If $Q_{total}$ is less than or equal to $Q_{cap}$, then the priority pro-rata allocation algorithm 1700 may proceed to the block 1708.

At block 1708, the priority pro-rata allocation algorithm 1700 may evaluate the total number of lots or contracts $Q_{total}$ with respect to a minimum order volume or limit $Q_{min}$. If $Q_{order}$ is less than $Q_{min}$, that is, if number of lots or contracts in the received order books is less than a minimum amount, then the priority pro-rata allocation algorithm 1700 may proceed along the path indicated by the arrow B to the block 1716. If $Q_{order}$ is greater than or equal to $Q_{min}$, then the priority pro-rata allocation algorithm 1700 may proceed to the block 1710.

At block 1710, the lots of contracts, under the one-thousand lot limit, in the received order $Q_{order}$ may be identified or designated as priority lots or contracts.

At block 1712, priority orders, i.e., orders in include the first one-thousand lots or contracts may be filled first according to pro-rata principles $Q_{prorata}$. If any lots or contracts within one or more of the orders remain unfilled after the pro-rata allocation, these lots or contracts may retain priority until they are filled.

At block 1714, the quantity of lots remaining to be filled or allocated $Q_{remaining}$ may be updated by subtracting the number of lots allocated utilizing pro-rata principles $Q_{prorata}$ from the original quantity of lots remaining to be filled or allocated $Q_{remaining}$.

At block 1716, the quantity of lots remaining to be filled or allocated $Q_{remaining}$ may be allocated to the remaining orders within the order book according to FIFO, pro-rata or any other known allocation principles or variations thereof.

At block 1718, the priority pro-rata allocation algorithm 1700 may wait for new incoming orders and proceed along the path indicated by the arrow C to the block 1702 upon receipt of a new order.

V. Multi-Level Allocation

In one embodiment a matching algorithm segment all of the resting orders and each segment may, in turn, be allocated lots according to a different principle. For example, one segment may be allocated lots according to FIFO principles, another segment according to pro-rata principles.

Figure 18:
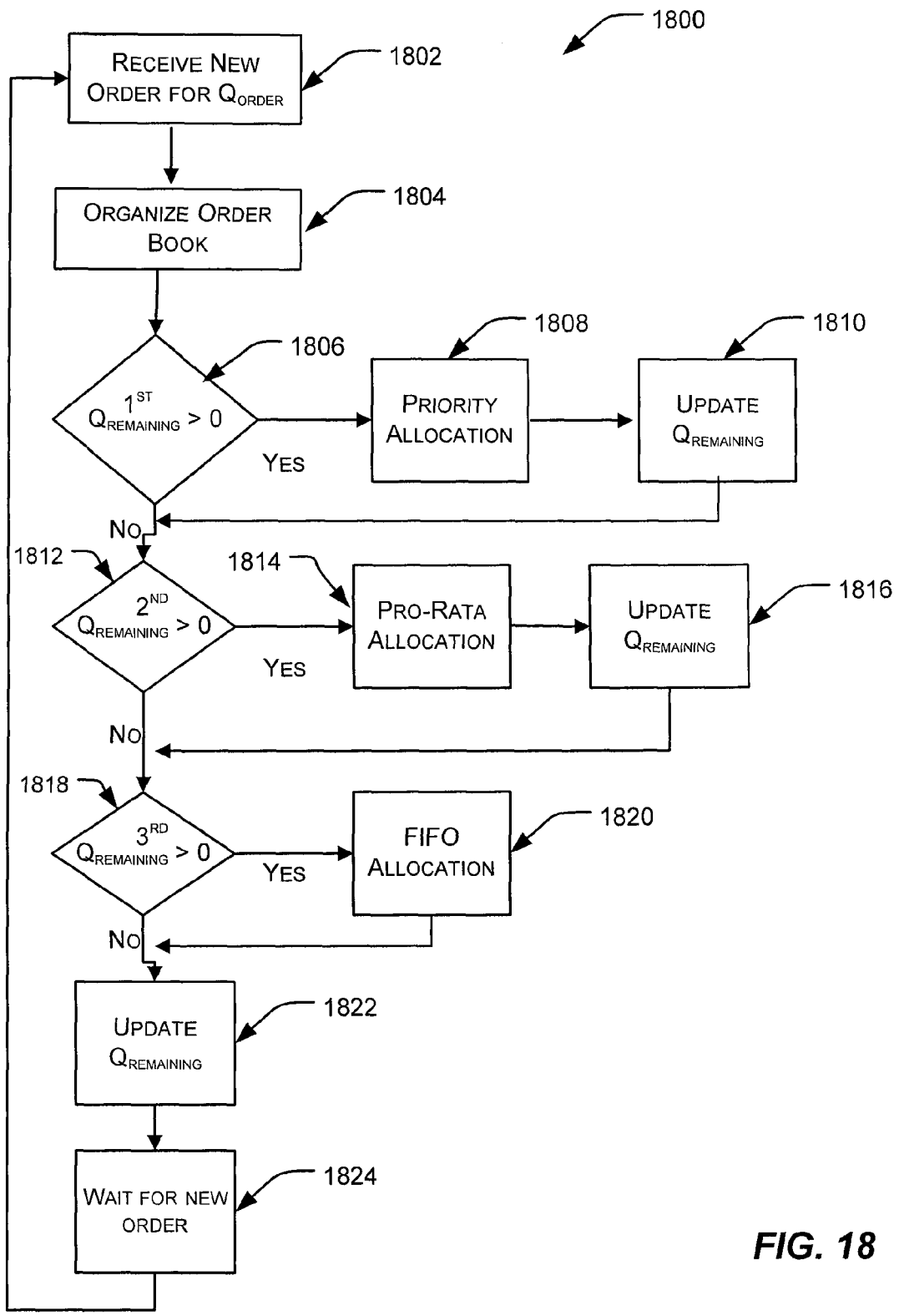
FIG. 18 illustrates an example of allocation of an incoming order according to a multi-level priority algorithm.

FIG. 18 Illustrates a multi-level allocation algorithm 1800, the teaching and disclosure of which may be implemented in connection with an existing market and order book such as, for example, the market discussed in connection with blocks 502 to 516 shown in FIG. 5. The multi-level allocation algorithm 1800 details another matching or allocation scheme for segmenting orders and distributing or allocating contra orders represented by the value of $Q_{remaining}$ according one or more parameters or criteria.

At block 1802, the multi-level allocation algorithm 1800 may receive a new order which in this present embodiment may be an offer to sell a plurality of lots $Q_{order}$.

At block 1804, the existing order book may be evaluated and organized, for example, any quantity of lots remaining to be filled or allocated $Q_{remaining}$ may be set to include or equal the plurality of lots $Q_{order}$. The quantity $Q_{remaining}$ may include any quantity of lots remaining from previous implementations of the multi-level allocation algorithm 1800. The existing order book may be further evaluated and organized into multiple levels or segments. For example, in one embodiment, (I) the first five (5) orders at a new high market price may be assigned to a first ($1^{st}$) segment or level; (II) the remaining received orders or standing orders $Q_{remaining}$ having a minimum order volume or limit $Q_{min}$ above a predetermined quantity may be assigned to a second ($2^{nd}$) segment or level; and (III) all other orders not allocated to first and second segments may be assigned to a third ($3^{rd}$) segment or level. It will be understood that orders may be segmented based on a variety of criteria, for example, orders may be assigned to second segment if they are orders having a price within a predefined number of ticks bid/order spread; if they are orders for a given quantity of lots; if they were received within a given time period, etc.

At block 1806, the first segment may be evaluated to determine if $Q_{remaining}$ associated therewith is greater than zero (0) indicating existence of orders within the first segment waiting to be filled, e.g., receive an allocation of lots. If $Q_{remaining}$ is greater than zero, at block 1808, the orders within the first segment may be designated as priority orders and allocated lots according to the priority. The allocation may be accomplished according to any known allocation principle, algorithm or technique. At block 1810, $Q_{remaining}$ may be updated to reflect the allocation of orders.

At block 1812, the second segment may be evaluated to determine if $Q_{remaining}$ associated therewith is greater than zero (0) indicating existence of orders within the first segment waiting to be filled, e.g., receive an allocation of lots. In particular, if $Q_{remaining}$ equaled zero (0) at block 1806 or another value at block 1810, then the value of $Q_{remaining}$ may be evaluated at block 1812. If $Q_{remaining}$ is greater than zero (0), at block 1814, the orders within the first segment may be designated as priority orders and allocated lots according to the pro-rata principles. Alternatively, the allocation may be accomplished according to any know allocation principle, algorithm or technique. At block 1816, $Q_{remaining}$ may be updated to reflect the allocation of orders.

At block 1818, the third segment may be evaluated to determine if $Q_{remaining}$ associated therewith is greater than zero (0) indicating existence of orders within the first segment waiting to be filled, e.g., receive an allocation of lots. In particular, if $Q_{remaining}$ equaled zero (0) at block 1812 or another value at block 1816, then the value of $Q_{remaining}$ may be evaluated at block 1818. If $Q_{remaining}$ is greater than zero (0), at block 1820, the orders within the first segment may be designated as priority orders and allocated lots according to the FIFO principles. Alternatively, the allocation may be accomplished according to any know allocation principle, algorithm or technique.

At block 1822, $Q_{remaining}$ may be updated to reflect the allocation of orders.

At block 1824, the multi-level allocation algorithm 1800 may wait for new incoming orders and proceed to the block 1802 upon receipt of a new order.

VI. Multiple Order Priority Allocation

In one embodiment a matching algorithm may be configured to designate a predefined number of orders as priority orders if the orders are determined to improve the market.

Figure 19:
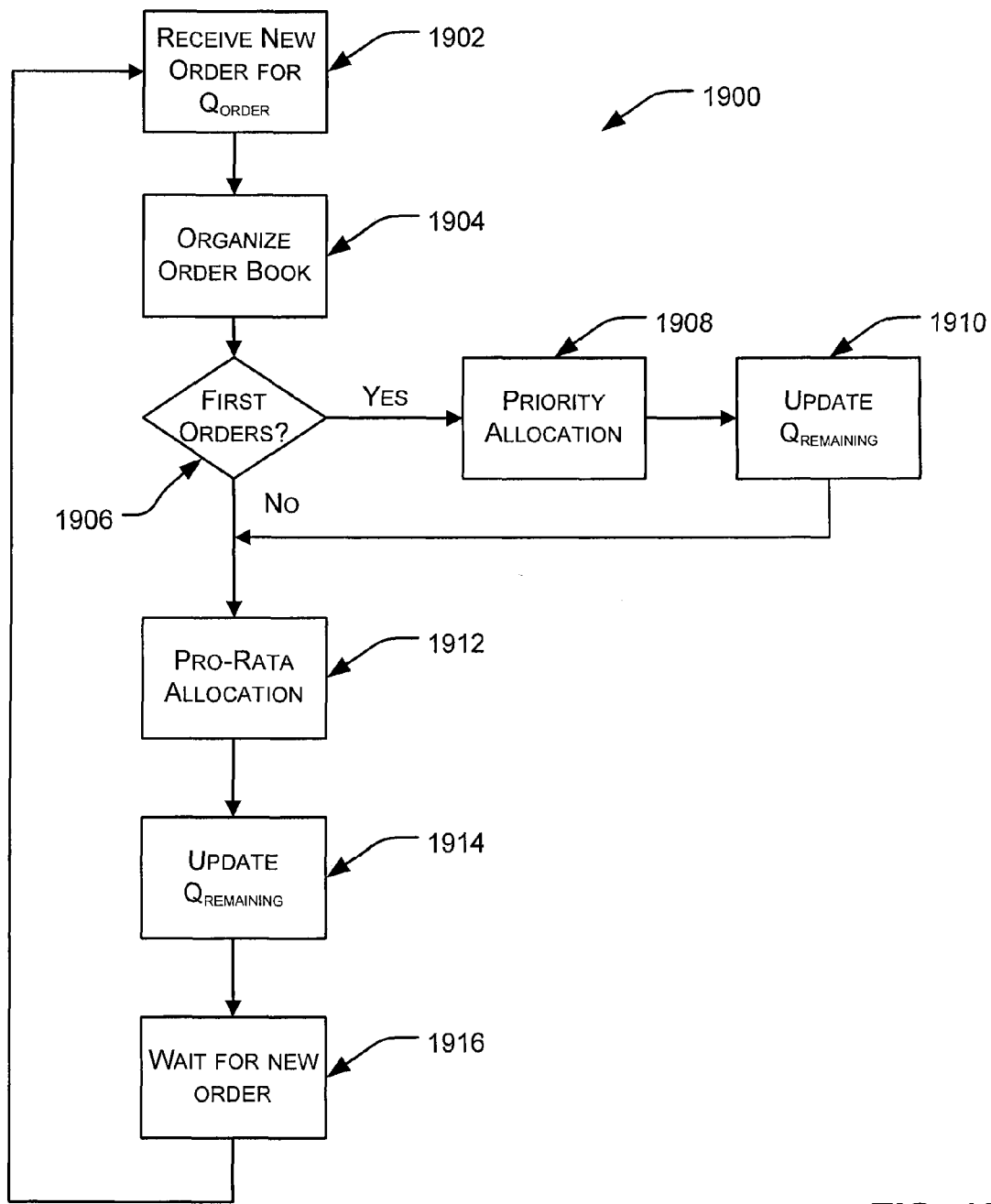
FIG. 19 illustrates an example of allocation of an incoming order according to a multiple order priority algorithm.

FIG. 19 Illustrates a multiple order priority algorithm 1900, the teaching and disclosure of which may be implemented in connection with an existing market and order book such as, for example, the market discussed in connection with blocks 502 to 516 shown in FIG. 5. The multiple order priority algorithm 1900 details another matching or allocation scheme for segmenting orders and distributing or allocating contra orders represented by the value of $Q_{remaining}$ according one or more parameters or criteria.

At block 1902, the multiple order priority algorithm 1900 may receive a new order which in this present embodiment may be an offer to sell a plurality of lots $Q_{order}$.

At block 1904, the existing order book may be evaluated and organized, for example, any the quantity of lots remaining to be filled or allocated $Q_{remaining}$ may be set to include or equal the plurality of lots $Q_{order}$. The quantity $Q_{remaining}$ may include any quantity of lots remaining from previous implementations of the multiple order priority algorithm 1900. In one embodiment, for example, the first five (5) orders at a new high market price may be identified and designated as priority orders. It will be understood that orders may be identified based on a variety of criteria, for example, orders may be identified based on the value of $Q_{order}$; a period of time in which the order was received, etc.

At block 1906, the orders within the order book may be evaluated to determine whether or not each order has been designated as a priority order. If, for example, $Q_{remaining}$ includes one or more of the designated priority orders, then at block 1908, the priority orders (the first five (5) orders at a new high market price in the present example, may be allocated lots according to the priority. The allocation may be accomplished according to any know allocation principle, algorithm or technique. At block 1910, $Q_{remaining}$ may be updated to reflect the allocation of orders.

At block 1912, if $Q_{remaining}$ did not include one or more of the designated priority orders or includes another value provided by the block 1810, then the lots associated with $Q_{remaining}$ may be allocated in accordance with pro-rata principles.

At block 1914, $Q_{remaining}$ may be updated to reflect the allocation of orders.

At block 1916, the multiple order priority algorithm 1900 may wait for new incoming orders and proceed to the block 1902 upon receipt of a new order.

VII. Timed Order Priority Allocation

In one embodiment a matching algorithm may be configured to designate a predefined number of orders as priority orders if the orders are received within a given period of time. Order that are not received within the given period of time are distributed according to pro-rata principles.

Figure 20:
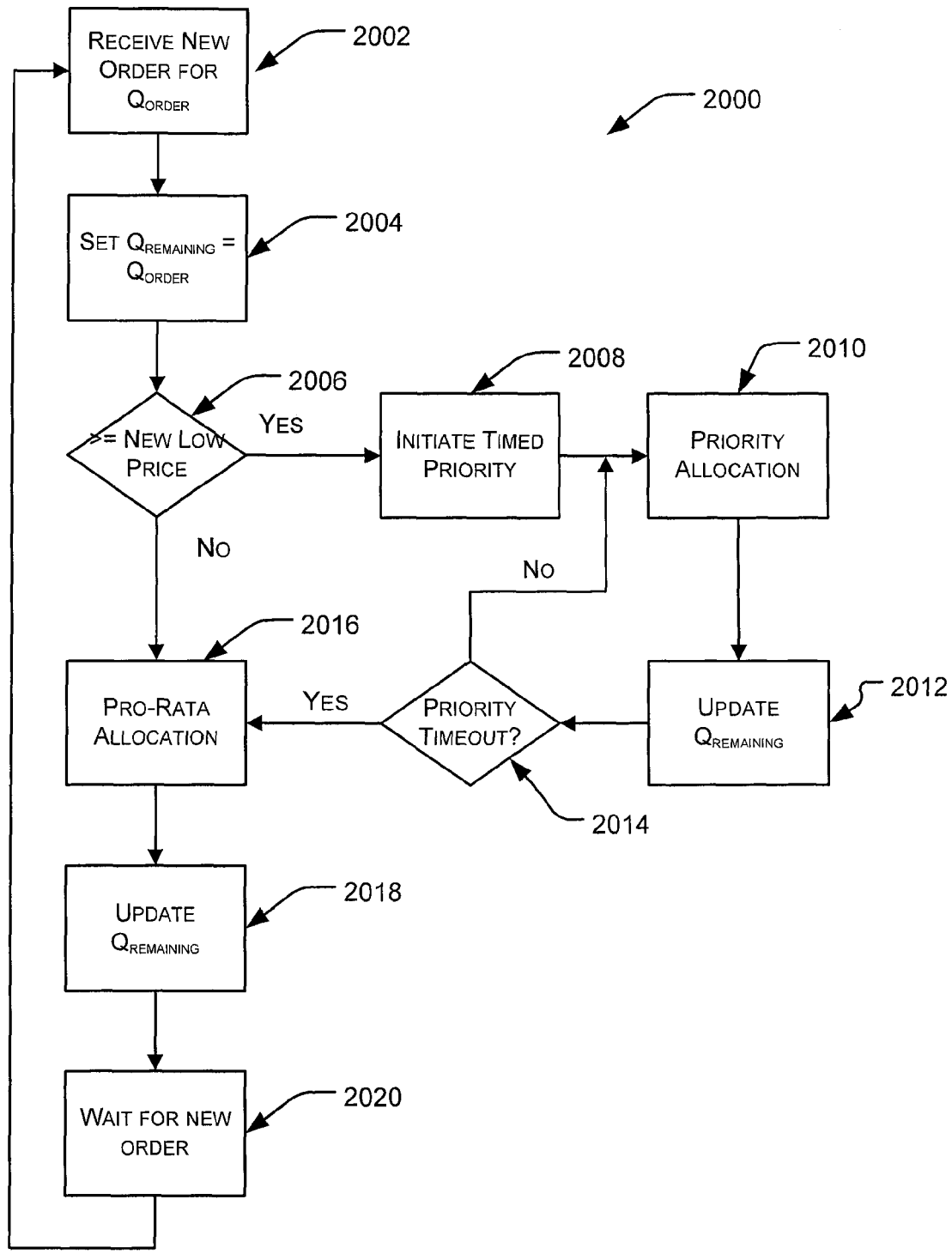
FIG. 20 illustrates an example of allocation of an incoming order according to a timed order priority algorithm.

FIG. 20 Illustrates a timed order priority algorithm 2000, the teaching and disclosure of which may be implemented in connection with an existing market and order book such as, for example, the market discussed in connection with blocks 502 to 516 shown in FIG. 5. The timed order priority algorithm 2000 details another matching or allocation scheme for segmenting orders and distributing or allocating contra orders represented by the value of $Q_{remaining}$ according one or more timing parameters or criteria.

At block 2002, the timed order priority algorithm 2000 may receive a new order which in this present embodiment may be an offer to sell a plurality of lots $Q_{order}$.

At block 2004, the quantity of lots remaining to be filled or allocated $Q_{remaining}$ may be set to include or equal the plurality of lots $Q_{order}$. The quantity $Q_{remaining}$ may include any quantity of lots remaining from previous implementations of the timed order priority algorithm 2000.

At block 2006, the price associated with $Q_{order}$ may be evaluated to determine if it represents the new low price for the market. If the price is determined to be the new low market price, then at block 2008, $Q_{order}$ may be designated as a priority order and a may be activated. The timer may be set for any time or priority period, for example, thirty (30) seconds, one (1) minute, etc.

At block 2010, the timed order priority algorithm 2000 may allocate new lots from contra received orders to satisfy or fill $Q_{order}$. For example, during the time or priority period, the timed order priority algorithm 2000 may allocate lots based on FIFO principles.

At block 2012, $Q_{remaining}$ may be updated to reflect the allocation of orders.

At block 2014, the predefined time or priority period may be evaluated against the elapsed time (initiated at block 2008) to determine if the priority period has ended. If the priority period has not ended, timed order priority algorithm 2000 may return to the block 2010.

At block 2016, if $Q_{order}$ was not associated with a new low market price as determined at block 2006 or the priority period has ended as determined at block 2014, then any lots associated with $Q_{remaining}$ may be allocated in accordance with pro-rata principles.

At block 2018, $Q_{remaining}$ may be updated to reflect the allocation of orders.

At block 2020, the timed order priority algorithm 2000 may wait for new incoming orders and proceed to the block 2002 upon receipt of a new order.

The trading methods, allocation algorithms and variants thereof generally relate to information processing and optimization. In particular, the disclosed trading methods and allocation algorithms embody methods and processes for allocating resources based on criteria such as, for example, price, quantity, time of receipt, etc.

Figure 21A:
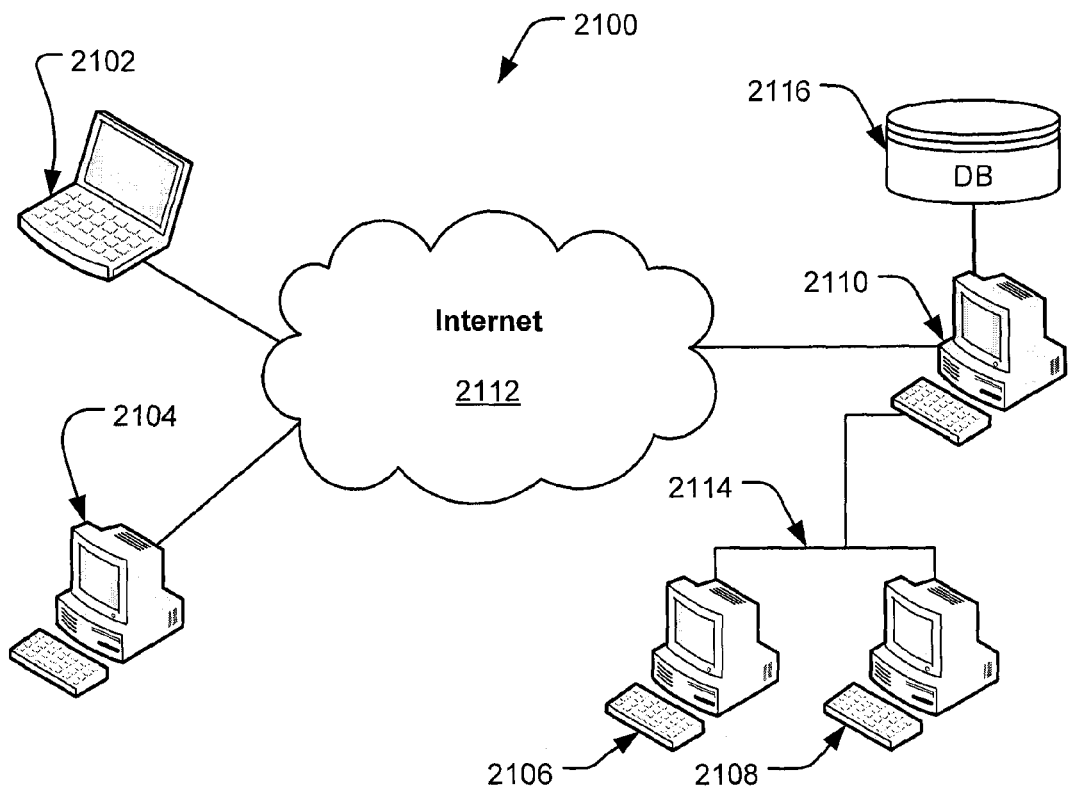
FIGS. 21A and 21B illustrates embodiments of systems, components and devices that may implement the disclosed allocation algorithms, methods and processes.

FIG. 21A illustrates one embodiment of a system 2100 configured to implement one or more of the disclosed trading methods, allocation algorithms, etc. The system 2100 may include multiple terminals 2102 to 2108 directly and/or indirectly in communication with an order management terminal 2110. For example, the terminals 2102 and 2104 may communicate with the order management terminal 2110 via the Internet 2112, a wide area network (WAN) and/or other communication network. The terminals 2106 and 2108 may communicate with the order management terminal 2110 via for example a communication network 2114 such as an Ethernet network, a wireless fidelity (WiFi) network and/or other communication network. The order management terminal 2110 may, in turn, be in communication with a database 2116 or other memory or storage device or medium. The database 2116 may be configured to store, in an accessible manner, the information, algorithms, parameters, etc. necessary to implement and monitor the trading methods, allocation algorithms disclosed herein. The database 2116 may be a separate device or logical construct or may be a portion of the order management terminal 2110.

Figure 21B:
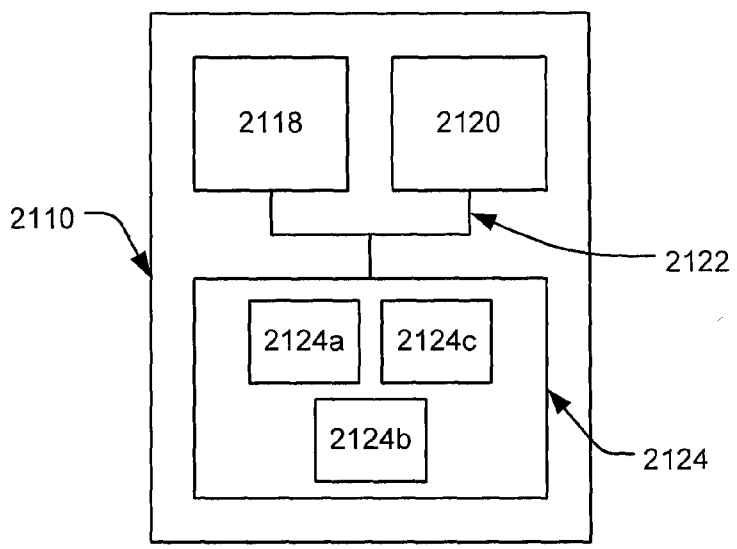

FIG. 21B illustrates one example of a logical configuration that may be implemented in the order management terminal 2110. For example, the order management terminal 2110 may include a communication module 2118 and a memory 2120 in communication with a processor 2124 via a communication bus 2122. The memory 2120 may include RAM, ROM, flash memory, or any other type of known storage medium. Moreover, the memory 2120 may include the database 2116 stored thereon. The communication module 2118 may be a wireless communication module or may be a wired communication module.

The processor 2124 may be a general purpose processor configured to execute the disclosed trading methods and allocation algorithms. Alternatively, the processor 2124 may represent one or more application specific processor or modules 2124a to 2124c. For example, the module 2124a may be a FIFO allocation module or processor; the module 2124b may be a pro-rata allocation module or processor; and the module 2124c may be a tracking module or processor for processing and updating the order status associated with each method and/or algorithm.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A computer-implemented method of order allocation, the computer-implemented method comprising:
    establishing an inner market representing a first portion of an order book at a computer-implemented trading host, wherein the inner market is defined as a function of an inner market parameter;
    establishing an outer market at the computer-implemented trading host, wherein the outer market represents a second portion of the order book that includes the remainder of the order book not represented by the inner market of the order book;
    allocating, via a FIFO allocation processor, a first portion of an incoming order to the inner market utilizing a first-in, first-out (FIFO) algorithm; and
    allocating, via a pro-rata allocation processor, a second portion, in excess of the first portion, of the incoming order to the outer market using a pro-rata algorithm.

2. The method of claim 1 further comprising:
    designating the first portion of the order book as a priority and allocating the first portion of the incoming order based on the priority.

3. The method of claim 2, wherein the priority is maintained for a period of time.

4. The method of claim 2, wherein the priority is maintained until the inner market changes as a function of the inner market parameter value.

5. The method of claim 1, wherein the inner market parameter represents at least one tick in a bid/offer spread.

6. The method of claim 1, wherein the inner market parameter represents at least the two best orders.

7. The method of claim 1, wherein the first-in, first-out (FIFO) algorithm includes a FIFO percentage to determine the percentage of the incoming order to be allocated according to the first-in, first-out (FIFO) algorithm.

8. The method of claim 1, wherein the pro-rata algorithm includes a pro-rata percentage to determine the percentage of the incoming order to be allocated according to the pro-rata algorithm.

9. The method of claim 1 further comprising:
    receiving the incoming order; and
    assigning the received incoming order to one of the inner or outer markets as a function of the inner market parameter value.

10. The method of claim 1, wherein the incoming order represents a futures contract.

11. The method of claim 1, wherein the incoming order represents an option.

12. The method of claim 1, wherein the order book represents the orders within an over-the-counter market.

13. A trading system configured for the matching and allocation of orders, the system comprising:
    a memory, wherein the memory is configured to store computer readable instructions;
    a processor in communication with the memory, the processor configured to execute the computer readable instructions, wherein the computer readable instructions are programmed to:
    establish an inner market representing a first portion of an order book, wherein the inner market is defined as a function of an inner market parameter;
    establish an outer market, wherein the outer market represents a second portion of the order book that includes the remainder of the order book not represented by the first portion of the order book;
    allocate a first portion of an incoming order to the inner market utilizing a first-in, first-out (FIFO) algorithm; and
    allocate a second portion, in excess of the first portion, of the incoming order to the outer market using a pro-rata algorithm.

14. The system of claim 13, wherein the computer readable instructions are further programmed to:
    designate the first portion of the order book as a priority and allocating the first portion of the incoming order based on the priority.

15. The system of claim 14, wherein the priority is maintained for a period of time.

16. The system of claim 14, wherein the priority is maintained for until the inner market changes as a function of the inner market parameter.

17. The system of claim 13, wherein the inner market parameter represents at least one tick in a bid/offer spread.

18. The system of claim 13, wherein the inner market parameter represents at least the two best orders.

19. The system of claim 13, wherein the first-in, first-out (FIFO) algorithm includes a FIFO percentage to determine the percentage of the incoming order to be allocated according to the first-in, first-out (FIFO) algorithm.

20. The system of claim 13, wherein the pro-rata algorithm includes a pro-rata percentage to determine the percentage of the incoming order to be allocated according to the pro-rata algorithm.

21. The system of claim 13, wherein the computer readable instructions are further programmed to:
   receive the incoming order; and
   assign the received incoming order to one of the inner or outer markets.

22. The system of claim 13, wherein the incoming order represents a futures contract.

23. The system of claim 13, wherein the incoming order represents an option.

24. The system of claim 13, wherein the order book represents the orders within an over-the-counter market.

25. A computer-implemented method of order allocation, the computer-implemented method comprising:
   receiving an incoming order at a computer-implemented trading host, wherein the computer-implemented trading host is configured to:
   establishing an inner market representing a first portion of an order book maintained within the computer-implemented trading host, wherein the inner market is defined as a function of an inner market parameter;
   designating the first portion of the order book as a priority and allocating the first portion of the received incoming order based on the priority;
   establishing an outer market, wherein the outer market represents a second portion of the order book that includes the remainder of the order book not represented by the first portion of the order book;
   assigning the received incoming order to one of the inner or outer markets as a function of the inner market parameter;
   allocating a first portion of the incoming order to the inner market utilizing a first-in, first-out (FIFO) algorithm implemented by a FIFO allocation processor; and
   allocating a second portion, in excess of the first portion, of the incoming order to the outer market utilizing a pro-rata algorithm implemented by a pro-rata allocation processor.

* * * * *